(12) United States Patent
Speyer et al.

(10) Patent No.: US 11,473,877 B2
(45) Date of Patent: Oct. 18, 2022

(54) BALLISTIC TILE

(71) Applicants: Robert F. Speyer, Atlanta, GA (US); Samuel Shackleford, Atlanta, GA (US)

(72) Inventors: Robert F. Speyer, Atlanta, GA (US); Samuel Shackleford, Atlanta, GA (US)

(73) Assignee: VERCO MATERIALS, LLC, Atlanta, GA (US)

( * ) Notice: Subject to any disclaimer, the term of this patent is extended or adjusted under 35 U.S.C. 154(b) by 370 days.

(21) Appl. No.: 16/421,958

(22) Filed: May 24, 2019

(65) Prior Publication Data
US 2020/0033097 A1    Jan. 30, 2020

Related U.S. Application Data

(60) Provisional application No. 62/676,056, filed on May 24, 2018.

(51) Int. Cl.
| | |
|---|---|
| *B32B 3/10* | (2006.01) |
| *B32B 3/14* | (2006.01) |
| *B32B 3/16* | (2006.01) |
| *F41H 5/02* | (2006.01) |
| *F41H 5/04* | (2006.01) |
| *B32B 5/26* | (2006.01) |

(52) U.S. Cl.
CPC ............ *F41H 5/0435* (2013.01); *B32B 3/16* (2013.01); *B32B 5/26* (2013.01); *F41H 5/02* (2013.01); *F41H 5/0492* (2013.01); *B32B 2260/023* (2013.01); *B32B 2260/046* (2013.01); *B32B 2262/0269* (2013.01); *B32B 2262/101* (2013.01); *B32B 2307/558* (2013.01); *B32B 2571/02* (2013.01)

(58) Field of Classification Search
CPC ......... B32B 2571/02; B32B 3/10; B32B 3/14; B32B 3/16; F41H 5/02; F41H 5/04; F41H 5/0414
See application file for complete search history.

(56) References Cited

U.S. PATENT DOCUMENTS 8,434,396 B1 * 5/2013 Wiley .................... F41H 1/02
89/36.01

\* cited by examiner

*Primary Examiner* — Joanna Pleszczynska
(74) *Attorney, Agent, or Firm* — Ostrolenk Faber LLP

(57) ABSTRACT

A ballistic tile for use in an imbricated pattern of like ballistic tiles to achieve coverage of a protected area by the imbricated pattern, while having rounded corners to limit the potential for spalling on ballistic impact. The ballistic tile may include a strike face that is generally undulating to laterally deflect at least a portion of the impact force, and to induce turning of the ballistic projectile on impact to further distribute the impact force. The ballistic tile may also include one or more features on an obverse and reverse side thereof that, when arranged in an imbricated pattern, limit lateral motion of the tiles on ballistic impact, and/or laterally transmit the energy of the projectile for deflection and absorption thereof.

13 Claims, 36 Drawing Sheets

BALLISTIC TILE

CROSS REFERENCE TO RELATED APPLICATION

This application is based on and claims benefit of U.S. Provisional Application Ser. No. 62/676,056, filed May 24, 2018, the entire disclosure of this application is incorporated by reference herein.

BACKGROUND OF THE INVENTION

The present application relates to the field of ballistic armor, and more particularly to an armor arrangement that includes a plurality of ballistic tiles cooperatively arranged to realize a flexible body.

The state of the art in torso protection is the (E/X)SAPI (small arms protective insert) plate. A typical SAPI plate armor includes a ceramic armor plate (SAPI plate) having a strike face and a compressed polymer fiber backing. A SAPI plate is usually a contoured plate that covers mostly the region of the heart and lungs. The advantage of a SAPI plate is that it is a comparatively lightweight body of consistent point-to-point ballistic behavior with respect to the first shot because it does not include seams, or redundant overlap of protection. The disadvantage of the SAPI plate is that it imposes a turtle-like discomfort for the user, and is unpredictable in second shot performance because of extensive random radial cracking often emanating from the point of impact of the first shot.

To provide flexibility, body armor comprised of imbricated tiles has been proposed by Neal, U.S. Pat. No. 6,510,777. Such an armor arrangement, while flexible, employs discus-shaped tiles having convex surfaces that make contact with one another when imbricated. Consequently, large gaps are formed between the tiles when the armor flexes. Furthermore, an imbricated arrangement of discus-shaped tiles is not weight-optimized compared to a SAPI plate.

SUMMARY OF THE INVENTION

A flexible armor system that is about as heavy as a SAPI plate will provide enhanced comfort and mobility for the wearer. Furthermore, an imbricated flexible armor system that is comprised of a plurality of tiles enhances the multi-hit capability of the armor. Moreover, situational adaptability with respect to areas of coverage is another unique advantage of an imbricated system. For example, additional body parts such as lower abdomen and torso sides can be covered with no additional manufacturing tooling since the protection is all based on the same-sized building block. Flexible armor systems could further be used as ballistic blankets to protect temporary structures and as add-on armor for vehicles.

An armor system according to the present invention improves multi-hit performance and the wearer's comfort and mobility through improvement in tile design and backing systems, and tuning the relative areal densities of ceramic and ballistic textile backing for optimum performance.

It is thus an object of the present invention to provide a ballistic tile for use in an imbricated pattern of like ballistic tiles to realize an armor system that can be configured for use as a flexible armor arrangement. The ballistic tile may include a strike face that is generally undulating to deflect the projectile and to induce the ballistic projectile to turn on impact to further distribute the energy of the projectile. The ballistic tile may also include features on an obverse and reverse sides thereof that facilitate imbrication alignment, control the motion of the tiles on ballistic impact to hinder disassembly of the arrangement, and/or transmit the energy of the projectile to other tiles for deflection and absorption thereof.

BRIEF DESCRIPTION OF THE DRAWING(S)

These and other features and advantages of the present disclosure will become apparent from the following description which refers to the accompanying drawings, wherein like reference numerals refer to like structures across the different views, and wherein.

DETAILED DESCRIPTION OF EMBODIMENTS OF THE INVENTION

An armor system according to the present includes an assembly of ballistic tiles cooperatively arranged to provide a flexible body that may be fashioned into a body armor or any other type of armor capable of intercepting a high velocity projectile, e.g. a bullet from a firearm, and preferably a rifle shot. Preferably, the tiles may be identically shaped whereby a repeating pattern may be obtained through imbrication of the tiles or a like method to cover any area of a person's body, a vehicle or the like.

Figure 1:
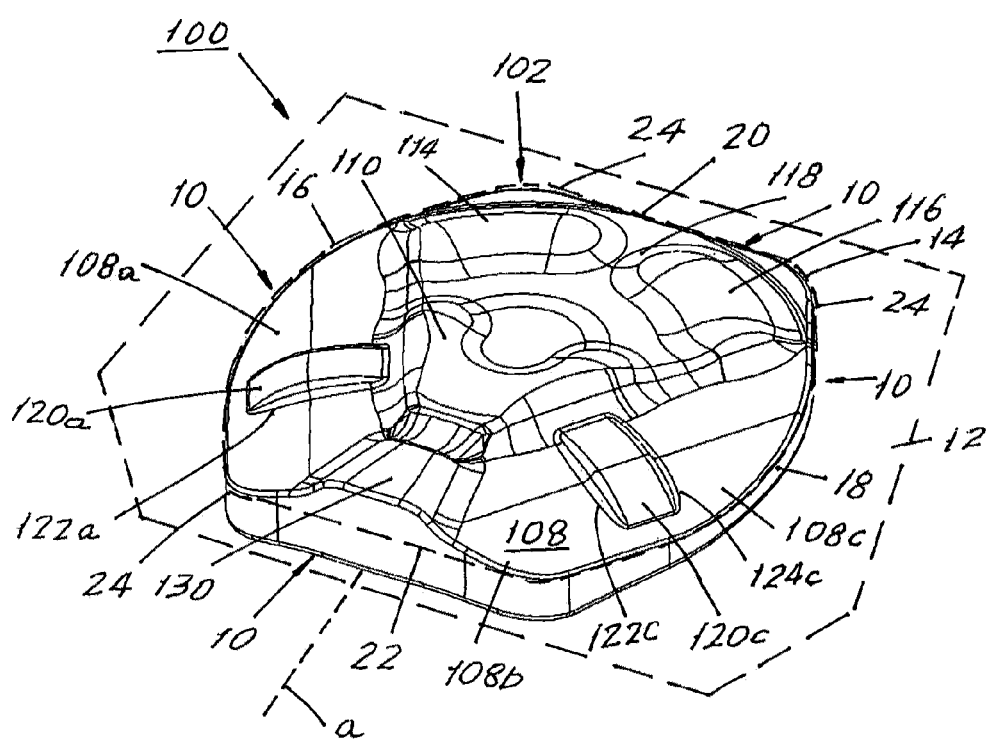
FIG. 1 illustrates a front perspective view of a ballistic tile according to a first embodiment of the present invention.
Figure 2:
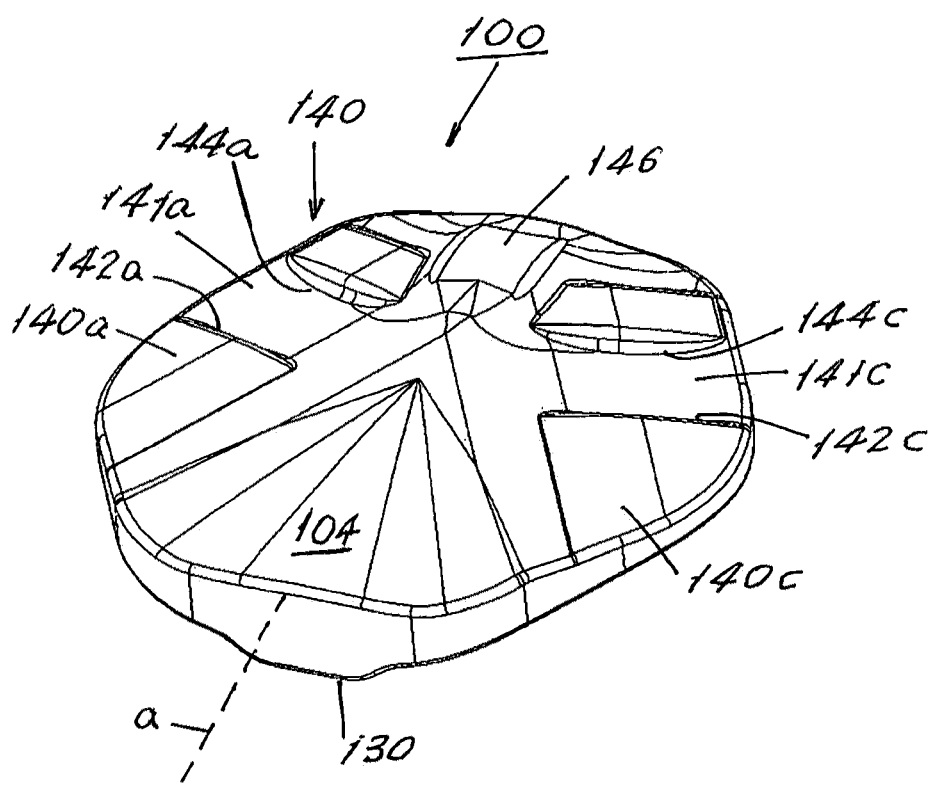
FIG. 2 illustrates a rear perspective view of a ballistic tile according to the first embodiment.

Referring now to FIG. 1, illustrated is a perspective view of a ballistic tile, generally 100, that may be used as a building block in an armor system according to a first embodiment of the present invention. FIG. 1 shows the obverse (i.e., front) side 102 of tile 100. FIG. 2 illustrates a perspective view of a reverse side 104 of the ballistic tile 100, which is opposite the obverse side 102 thereof.

A tile 100 according to the present invention is a single, unitary body the terminal boundary of which is defined by a continuous and endless edge 10 between the obverse 102 and the reverse 104 sides thereof which is at least partially intersected by a plane 12 residing at least partially between the obverse side 102 and the reverse side 104 of the tile. The intersection of the continuous and endless edge 10 of the tile and the intersecting plane 12 results in a geometric profile 14 (shown by broken lines) that includes a first peripheral boundary 16, a second peripheral boundary 18, a third peripheral boundary 20 and a fourth peripheral boundary 22. First and second peripheral boundaries 16, 18 are directly opposite one another and third and fourth boundaries 20, 22 are directly opposite one another. According to one aspect of the present invention, first and second boundaries 16, 18 are arcuate and have a first radius of curvature that is less than infinity and the third and fourth peripheral boundaries have a second radius of curvature that is larger than the first radius of curvature and is near infinity; i.e. substantially flat, whereby third and fourth boundaries 20, 22 can be considered substantially parallel to one another. First and second peripheral boundaries 16, 18 are connected to respective ends of third and fourth peripheral boundaries 20, 22 by a respective rounded corner 24 each having a radius of curvatures that is less than the first radius of curvature. As will be apparent from the following description of the embodiments of the tile, in one embodiment of the present invention the third and fourth boundaries coincide (i.e. lie on the plane of) with a portion of the edge 10 of the tile and the first and the second boundaries 16, 18 may only partially coincide with corresponding portions of the edge 10 of the tile 100. Consequently, one or more of the rounded corners 24 may not coincide with respective portions of the edge of the tile. The geometric profile 24 as defined herein may not coincide with the edge 10 everywhere along the edge because, as will become apparent, certain sections of tile 100 are recessed. However, it should be noted that the geometric profile 24 would appear to coincide with the border of obverse side 102 or reverse side 104 with the endless and continuous edge 10 when the tile is viewed in plan view as shown, for example, by FIGS. 3 and 4.

As shown in FIG. 1, the ballistic tile 100 has a strike face 106. Strike face 106 is that portion of the obverse side 102 that is designated to initially engage an incoming ballistic projectile, when a plurality of such ballistic tiles 100 are arranged in an imbricated pattern as described further herein. Thus, strike face 106 of each tile would not face the entity protected by an armor system according to the present invention but rather faces the opposite direction when the armor system is deployed. The portion of the obverse side 102 outside the strike face 106 is a shelf face 108, upon which an adjacent corresponding ballistic tile 100 will rest, or which will be overlapped by a corresponding portion of the reverse side 104 of another ballistic tile 100. Note that each shelf face 108 is realized by a surface that slopes downwardly toward the edge 10 of the tile 100 from the center of the tile 100. Consequently, depending on the degree to which the surface slopes downwardly, portions of the edge 10 of the tile that are adjacent the shelf face 108 may not coincide with certain portions of the first and the second terminal boundaries 16, 18 of the geometric profile 14, but are spaced from the same.

Strike face 106 is characterized by variations in height, thereby forming a generally undulating surface. The undulating surface of strike face 106 will minimize the probability that a projectile travelling along any trajectory will make contact with strike face 106 at a ninety degree angle. Accordingly, by minimizing the portion of the strike face 106 that is perpendicular to an oncoming ballistic projectile, the corresponding probability that the ballistic projectile will engage the strike face 106 at some oblique or non-perpendicular angle is maximized. Also, by engaging the strike face 106 at a non-perpendicular or oblique angle, at least a portion of the energy of the ballistic projectile is directed laterally, decreasing the energy directed in a direction generally perpendicular to the strike face 106, i.e., towards the protected area, e.g. the wearer of a body armor panel comprising the ballistic tiles 100 according to the present invention. Thus, the strike face 106 will not present many opportunities for a point of impact on a trajectory of an oncoming ballistic projectile that is perpendicular to the strike face whereby the energy delivered by the projectile is minimized and the projectile is diverted from its trajectory along another trajectory. Moreover, the undulating surface of the strike face 106 would tend to turn the incoming ballistic projectile upon impact. This would expose more of the surface of the tile 100, and particularly the strike face 106, or even and more preferably multiple tiles 100 and respective strike faces 106, to the impact of the ballistic projectile. The energy of the projectile would be further distributed and dissipated over a larger area to improve the resistance of the tiles 100 to the ballistic impact.

The undulations on the strike face 106 are realized by a relief pattern that includes a raised ridge 110 with a convex exterior surface that partially and continuously surrounds a central depression 112, angularly spanning around 180-240 degrees around the central depression 112 preferably. An upper portion of the relief pattern on the strike face 106 (closest to third terminal boundary 20 relative to raised ridge 110) includes two arcuate ridges 114, 116 formed preferably concentrically with the central depression 112, each having a convex exterior surface. A further depression 118 separates the ridges 114, 116. Moreover, ridge 110 and arcuate ridges 114, 116 may further include minor variations in height, in order to further undulate the surface of the strike face 106. For example, ridge 110 may be slightly, yet discernibly, higher at its ends and at its center than at the intermediate portions therebetween.

The shelf face 108 includes lateral shelf face sections 108*a*, 108*c* each residing on either side of the vertically downward axis a, and each adjacent to and on opposite sides of a lower shelf face section 108*b* centered on the axis a. The shelf face 108 and its sections 108*a*, 108*b*, 108*c* are shaped to correspond to a respective section of the reverse side 104 of an adjacent imbricated tile 100. The shelf face 108 optionally includes features to facilitate the interaction and cooperation of one ballistic tile 100 with an adjacent tile 100 when the tiles are arranged in an imbricated pattern. In particular, lateral shelf face sections 108*a*, 108*c* feature protrusions 120*a*, 120*c* respectively. Protrusions 120*a*, 120*c* are aligned generally radially with the ballistic tile 100, and each includes at least one generally radial edge 122*a*, 122*c*, respectively, and in this case second such generally radial edges 124*a*, 124*c*. Radial edges 122*a*, 122*c*, 124*a*, 124*c*, present a surface rising out of the obverse side 102 and particularly lateral shelf faces 108*a*, 108*c*, respectively. In combination with corresponding features, namely, edges of recesses, on the reverse side 104 of an adjacent imbricated ballistic tile 100 (edges 142*a*, 142*c*, 144*a*, 144*c*), protrusions 120*a*, 120*c* serve to register the tiles to realize the proper imbricated pattern and help resist lateral shifting of the ballistic tiles 100 in response to the impact of a ballistic projectile, when imbricated. This resistance to lateral shifting is particularly beneficial with regard to the strike face 106 that is provided with an undulating surface, or otherwise designed to laterally deflect the energy of the projectile.

In the exemplary embodiments the thickness of the tile 100 is reduced at shelf face 108, and particularly at lateral shelf faces 108*a*, 108*c*. Because, when imbricated, an adjacent tile 100 will overlap one of these areas, the thickness of that portion of the tile that is designated to overlap a shelf section 108*a*, 108*c* may be optionally reduced in order to reduce the overall weight of the imbricated pattern. On the other hand, any reduction in thickness can be minimized or eliminated in order to improve the mechanical properties of areas of the tile that overlap other tiles. Thus, the thickness of the overlapping areas can be adjusted according to the need of the design without departing from the scope of the present disclosure. It has been found that if the total thickness of the overlapping regions of two tiles 100 is equal to the thickest portion of a single tile 100, the overlapped arrangement may be significantly weaker despite being as thick as the thickest portion of a single tile. Thus, according to another aspect of the present invention, the shape of each tile is configured so that the total thickness of the overlapping regions of two tiles 100 is between 18% to 75% higher than the thickest portion of a single tile, whereby the overlapped regions of two overlapping tiles are rendered as robust as the thickest portion of a single tile. Note that, unlike the overlapped regions of two bodies of equal thickness (e.g. two flat bodies of equal thickness) which is 100% thicker than the thickness of a single body, the thickest portion of the overlapping regions in an imbricated arrangement according to the present invention is less than 100% thicker (i.e. at most 75% thicker) than the thickest part of a single tile. Thus, an imbricated arrangement employing tiles according to the present invention should weigh less than an imbricated pattern employing discus-shaped tiles or flat tiles of equal thickness.

Lower shelf face section 108*b* is further provided with a protrusion 130. Protrusion 130 engages a corresponding protrusion on reverse side 104 of another tile 100 when tiles 100 are imbricated. The raised surface of the protrusion 130 ensures consistent contact between the imbricated ballistic tiles 100, which at that point will be somewhat higher (see, e.g., FIG. 7). The contact provided through protrusion 130 establishes part of a pathway network among adjacent imbricated ballistic tiles 100 for the deflection, distribution and dissipation of the energy from a ballistic projectile.

Referring now to FIG. 2, the reverse side 104 includes features to interface with adjacent ballistic tiles 100 to realize an imbricated arrangement. Note the position of axis a for understanding the positions of features on the reverse side 104 relative to positions of features on the obverse side 102. The reverse side 104 includes a footprint area 140, made up of lateral foot print areas 140*a*, 140*c*, each residing lateral to a respective side of the axis a, and both adjacent a central footprint area 140*b*. Lateral footprint areas 140*a*, 140*c* are areas designated to overlap shelf sections 108*c*, 108*a*, respectively, on the obverse side 102 of a respective tile. Specifically, when the ballistic tiles 100 are assembled in an imbricated fashion, the lateral footprint area 140*a* of one tile will rest upon the lateral shelf area 108*a* of one adjacent ballistic tile 100, and lateral footprint area 140*c* will rest upon the lateral shelf area 108*c* of another adjacent ballistic tile 100.

Each lateral footprint area 140*a*, 140*c*, in this embodiment of the present invention, includes a surface that slopes downwardly relative to the central portion of the reverse face 104 toward the edge of the tile and includes a generally radial channel 141*a*, 141*c*. Channels 141*a*, 141*c* are the recesses mentioned earlier that are sized to receive protrusions 120*a*, 120*c*, respectively, on the obverse side 102 of a respective ballistic tile 100. Channels 141*a*, 141*c* are bordered by generally radial edges 142*a*, 142*c*, and 144*a*, 144*c*, which engage with edges 122a, 122c and 124a, 124c, respectively, on the obverse side 102 of a respective tile 100 to resist lateral shifting of the ballistic tiles 100 when imbricated, and to facilitate the registration and the alignment of tiles 100 during the imbrication process. Positioned within or near central footprint area 140b is a stand 146. Stand 146 is sized and positioned to make contact with protrusion 130 on the obverse side 102 of an adjacent ballistic tile 100 when imbricated. The height and width of the stand 146 (and/or protrusion 130) may be adjusted according to the space required to be filled between adjacent tiles 100 in the imbricated pattern, and to achieve the desired contact and coverage from all potential ballistic trajectories. Note that footprint areas 140a, 140c while configured to overlap shelf sections 108a, 108c of other tiles, may not have a surface that corresponds perfectly with the surfaces of shelf sections 108a, 108c. Consequently, tiles 100 may rock slightly when imbricated according to another aspect of the present invention.

Figure 3:
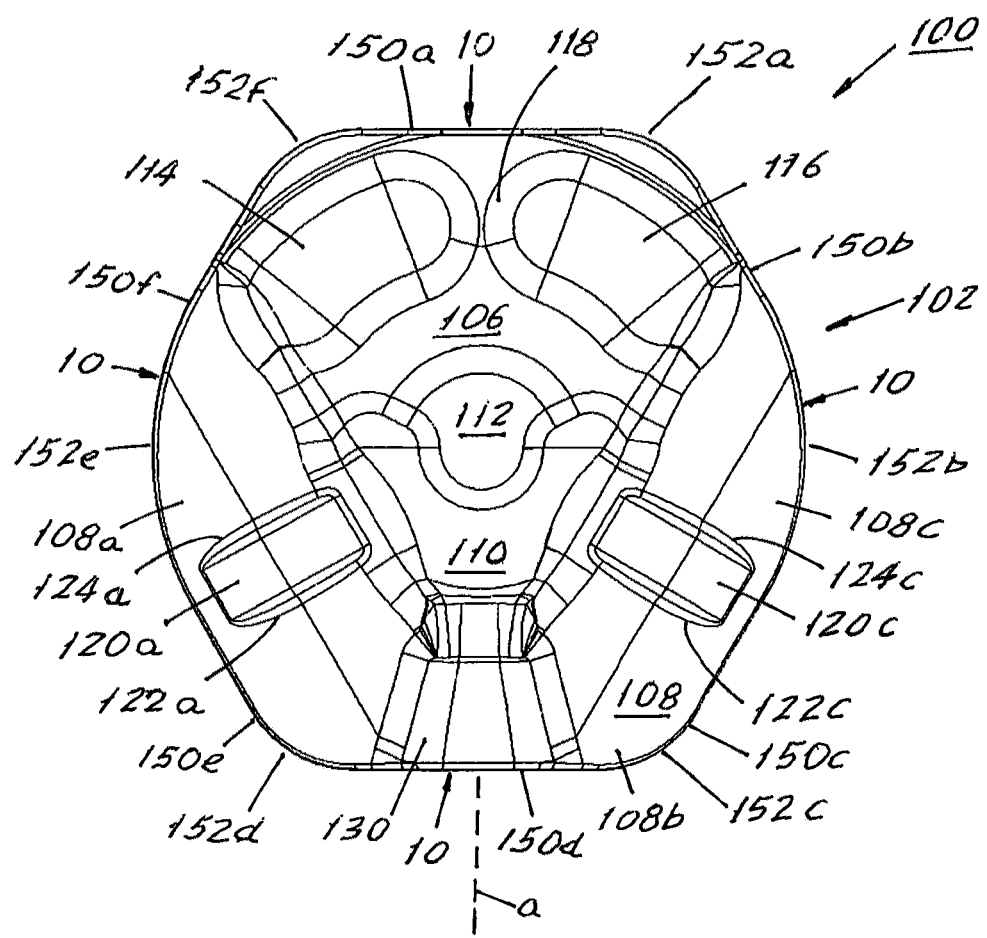
FIG. 3 illustrates a front elevation view of a ballistic tile according to the first embodiment.

Turning then to FIG. 3, illustrated is a front elevation view of the ballistic tile 100. The features of the obverse side 102 described above with reference to FIG. 1 are shown, and their description will not be repeated. The front elevation view of FIG. 3 illustrates the geometric profile 14 of the tile 100. The geometric profile of tile 100 affords improved coverage of the overall protected area when assembled in an imbricated fashion to provide enhanced protection against ballistic projectiles as compared with prior art discus-shaped tiles, while incurring only minimal additional weight penalty over a discus-shaped tile. Moreover, as for example shown by FIG. 9, the geometric profile of tiles 100 allows for better coverage of the edges of the tiles when arranged in an imbricated pattern. Specifically, as is clearly shown, the curved portion of the edge of the tile allow for increased overlapping of the tiles, while the relatively flat top portion (portion nearest ridges 114, 116) of the edge 10 of the tiles allow for the protection of the seams between the tiles directly behind the bottom of ridges 100, while the seams between the curved edges of the tiles can sit behind and be protected by respective sides of ridges 110 of the tiles in the imbricated pattern. Furthermore, corners of tiles are rounded to reduce stress concentrations, and to reduce the likelihood that they will fracture off in response to a ballistic impact, a danger known as spalling. Those fractured particles often have sharp edges, are travelling at high speed, and themselves present a danger to the protected area.

Figure 4:
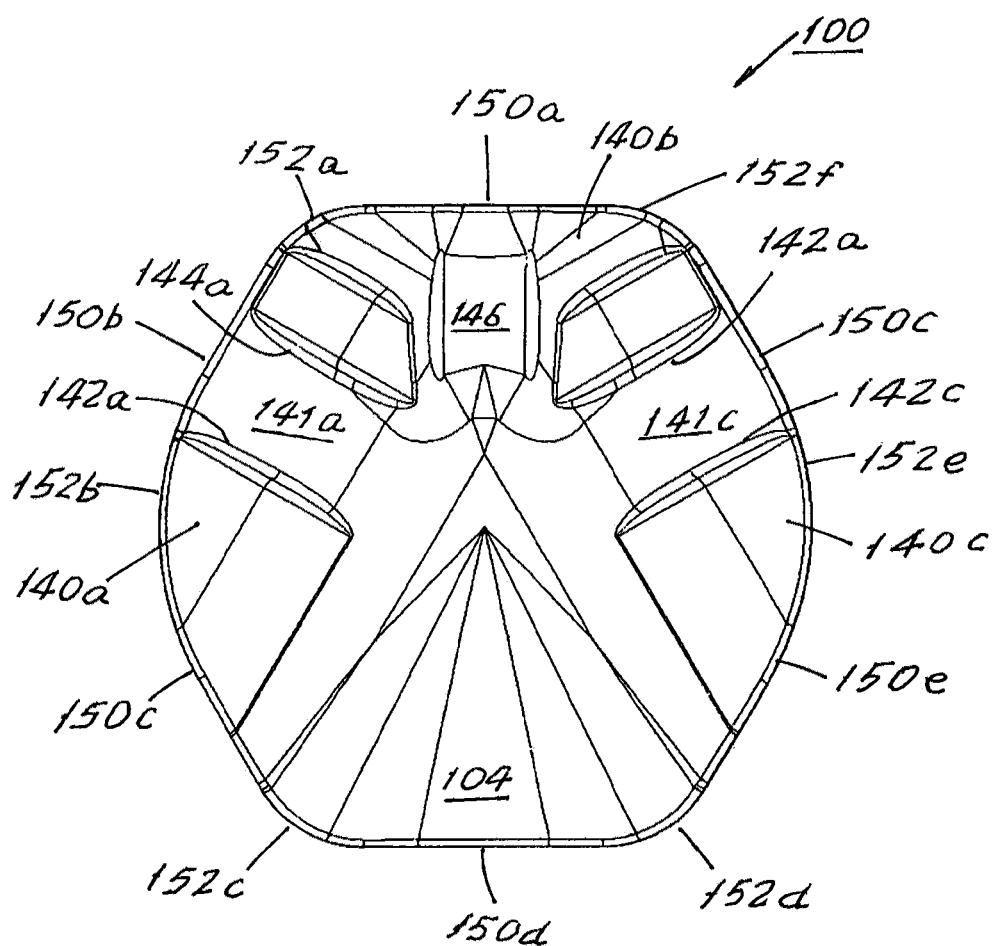
FIG. 4 illustrates a rear elevation view of the ballistic tile according to the first embodiment.
Figure 5:
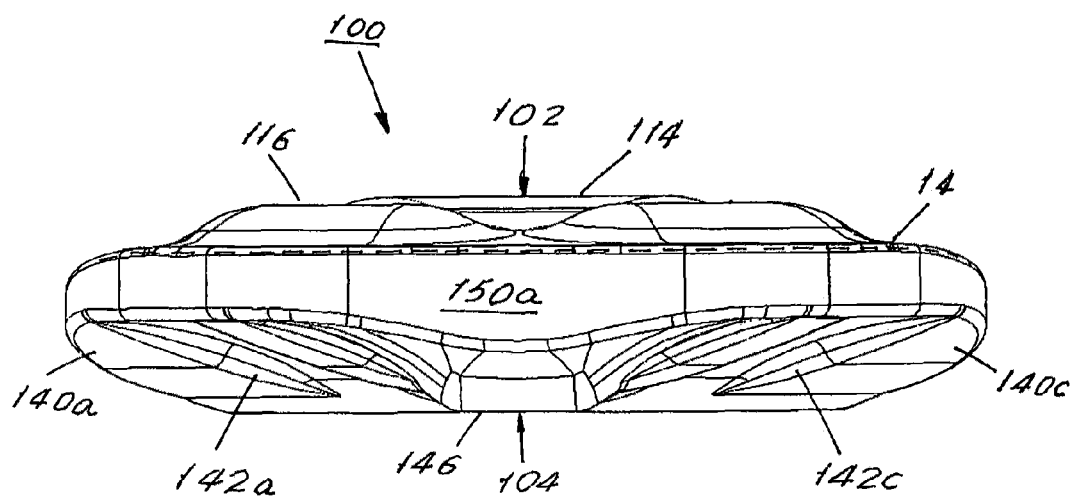
FIG. 5 illustrates a top plan view of the ballistic tile according to the first embodiment.
Figure 6:
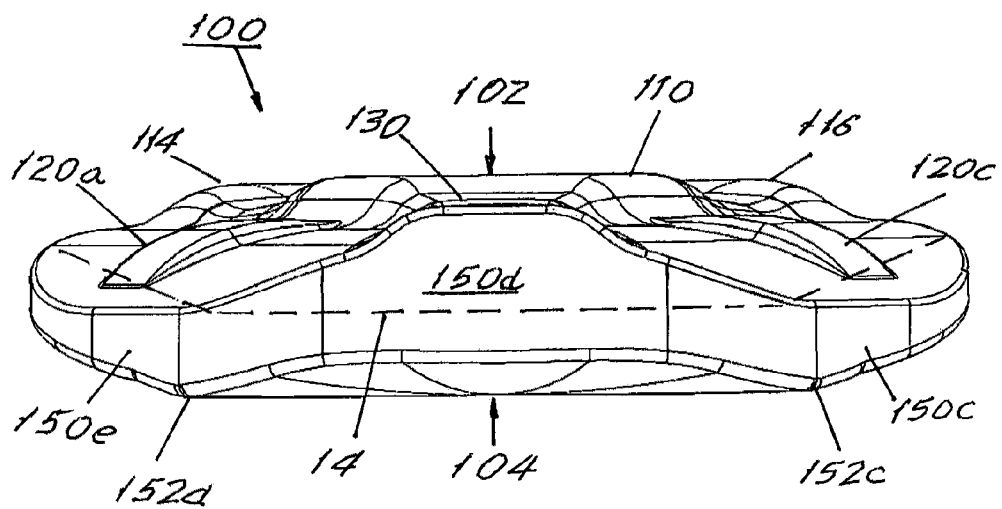
FIG. 6 illustrates a bottom plan view of the ballistic tile according to the first embodiment.

With reference to the foregoing description, the features of the ballistic tile 100 will be apparent as shown in the various views of FIGS. 4-6. FIG. 4 illustrates a rear elevation view of the ballistic tile 100. FIG. 5 illustrates a top plan view of the ballistic tile 100, with the obverse side 102 facing upward as shown, and the reverse side 104 facing downward. FIG. 6 illustrates a bottom plan view of the ballistic tile 100, with the obverse side 102 again facing upward, and the reverse side 104 facing downward.

Figure 7:
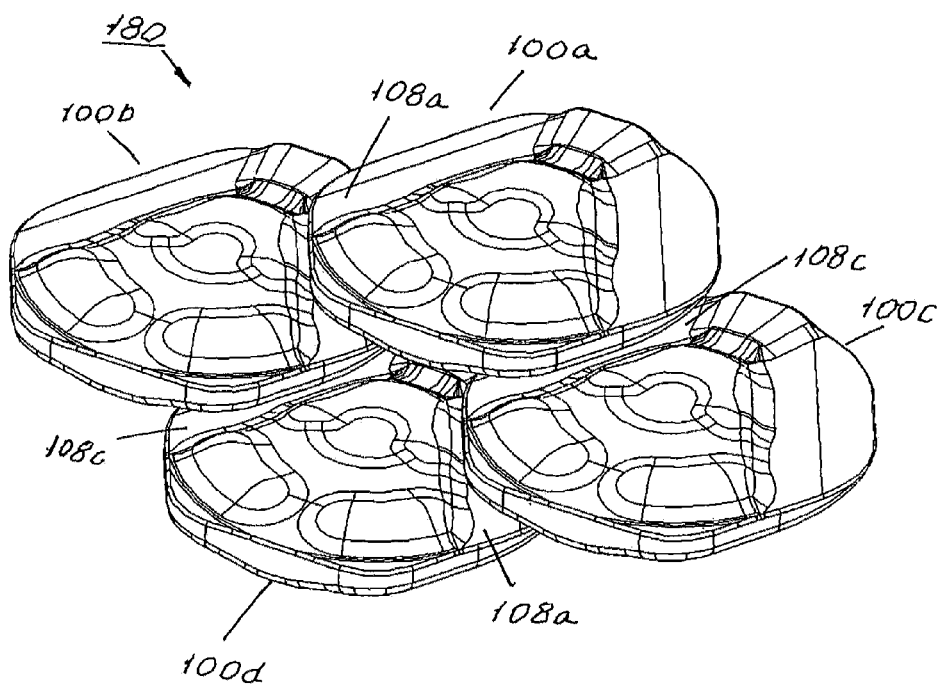
FIG. 7 illustrates a front perspective view of a four-tile imbricated pattern of ballistic tiles according to the first embodiment.

Referring then to FIG. 7, illustrated is a perspective view of a four-tile imbricated pattern 180, representative of the imbrication pattern of the ballistic tiles 100 which can be repeated as needed. In this case, the imbricated pattern 180 comprises four tiles 100a-d. The lateral footprint area 140a of tile 100c rests upon shelf area 108a of tile 100d. Therein, the protrusion 120a of tile 100d lies within recess 141a of tile 100c. Edges 122a and 124a of tile 100d interface with edges 142a and 144a of tile 100c, respectively. Similarly, lateral footprint area 140c of tile 100b rests upon shelf area 108c of tile 100d. Therein, the protrusion 120c of tile 100d lies within recess 141c of tile 100b. Edges 122c and 124c of tile 100d interface with edges 142c and 144c of tile 100b.

Tile 100a lies partially over three tiles, namely tiles 100b, 100c and 100d. Lateral footprint area 140a of tile 100a rests upon shelf area 108a of tile 100b. Therein, the protrusion 120a of tile 100b lies within recess 141a of tile 100a. Edges 122a and 124a of tile 100b interface with edges 142a and 144a of tile 100a. Similarly, lateral footprint area 140c of tile 100a rests upon shelf area 108c of tile 100c. Therein, the protrusion 120c of tile 100c lies within recess 141c of tile 100a. Edges 122c and 124c of tile 100c interface with edges 142c and 144c of tile 100a. Finally, central footprint area 140b of tile 100a rests upon shelf area 108b of tile 100d. Stand 146 of tile 100a rests upon protrusion 130 of tile 100d. It will be appreciated by those skilled in the art that this relationship is merely exemplary, and can be continued and extended by the addition of additional ballistic tiles 100 laterally, extending any of the three courses of tiles in either or both directions, and vertically in either direction by adding additional courses of tiles in a similar imbricated fashion.

Figure 8:
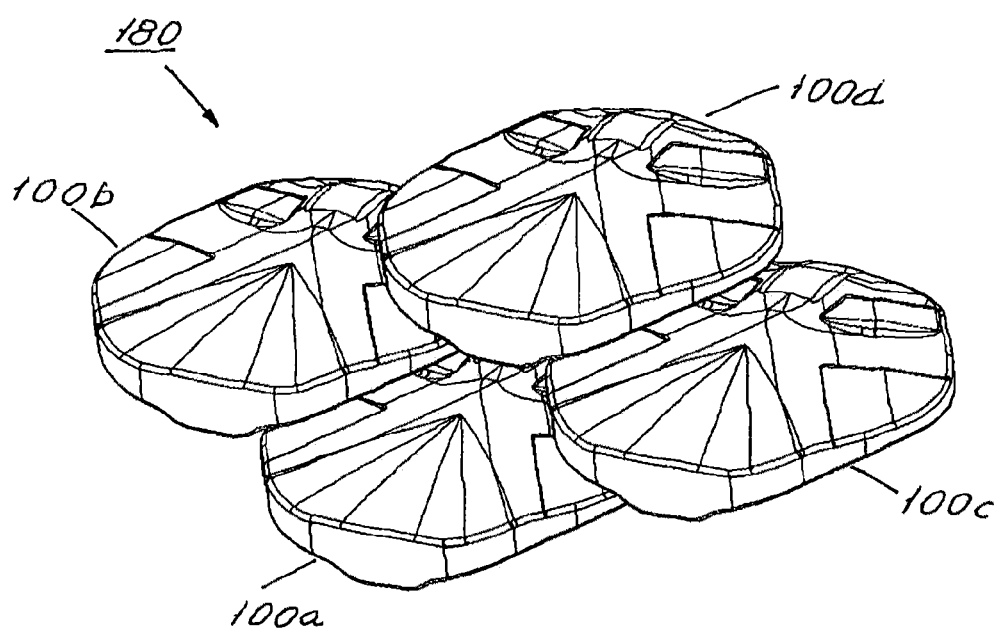
FIG. 8 illustrates a rear perspective view of the four-tile imbricated pattern of ballistic tiles according to the first embodiment.
Figure 9:
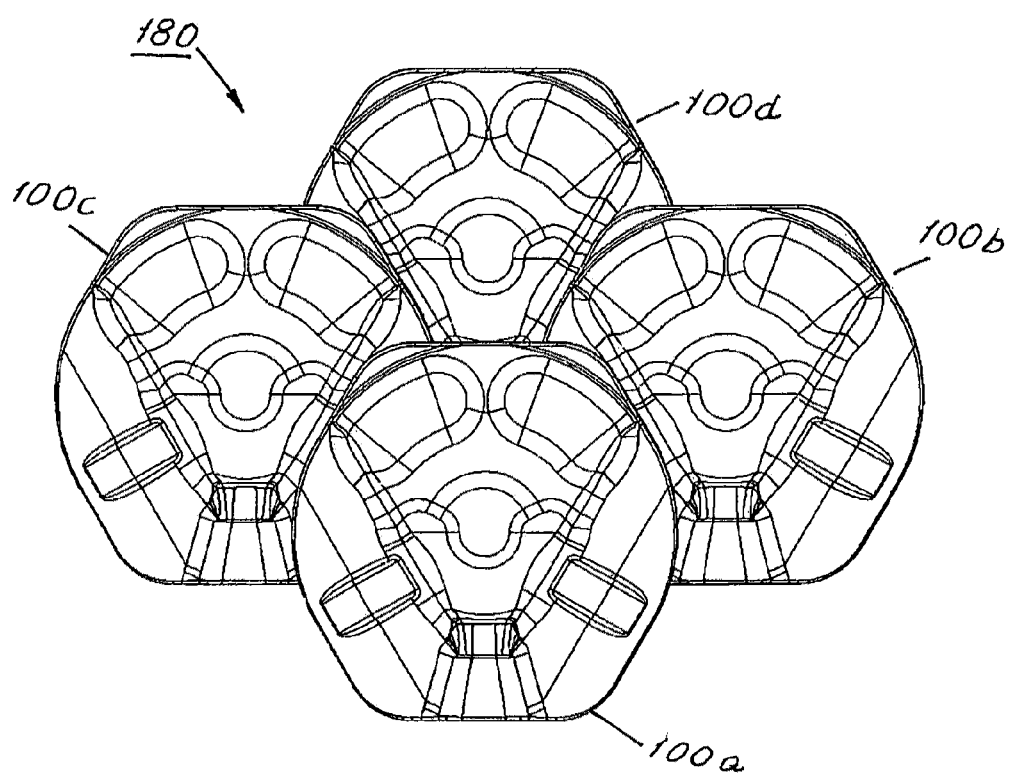
FIG. 9 illustrates a front elevation view of the four-tile imbricated pattern of ballistic tiles according to the first embodiment.
Figure 10:
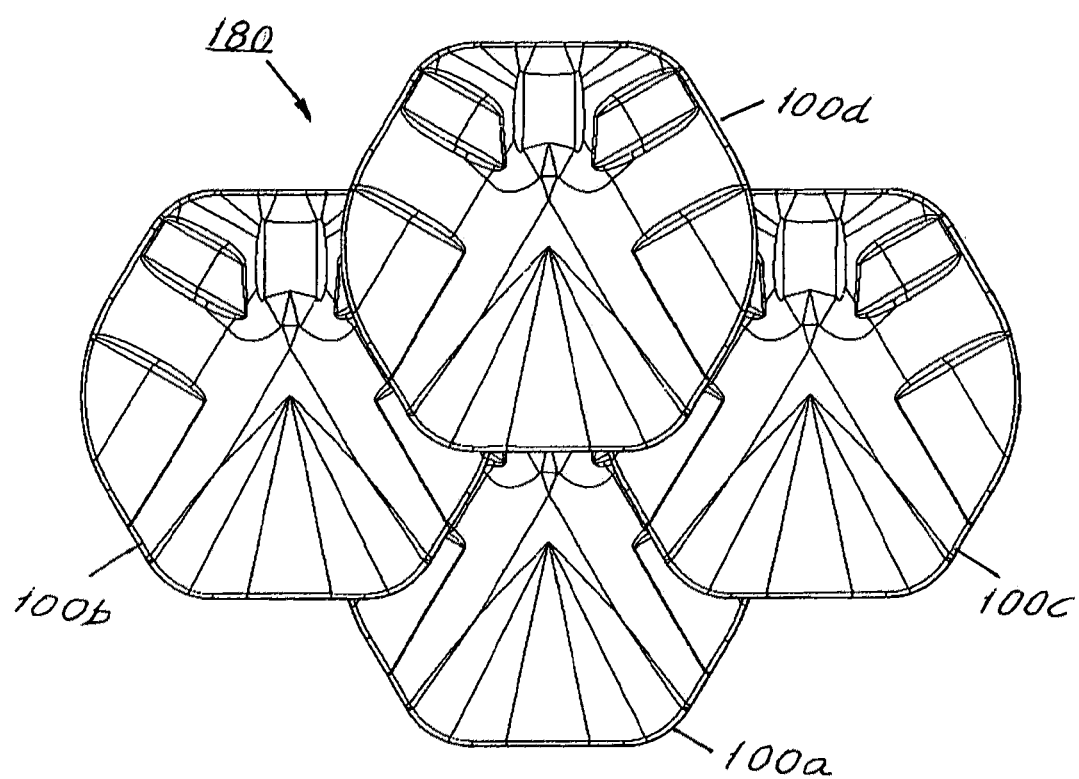
FIG. 10 illustrates a rear elevation view of the four-tile imbricated pattern of ballistic tiles according to the first embodiment.

With reference to the foregoing description, the features of the imbrication pattern 180 will be apparent as shown in the various views of FIGS. 8-10. FIG. 8 illustrates a rear perspective view of the imbrication pattern 180. FIG. 9 illustrates a front elevation view of the imbrication pattern 180. FIG. 10 illustrates a rear elevation view of the imbrication pattern 180.

Figure 11:
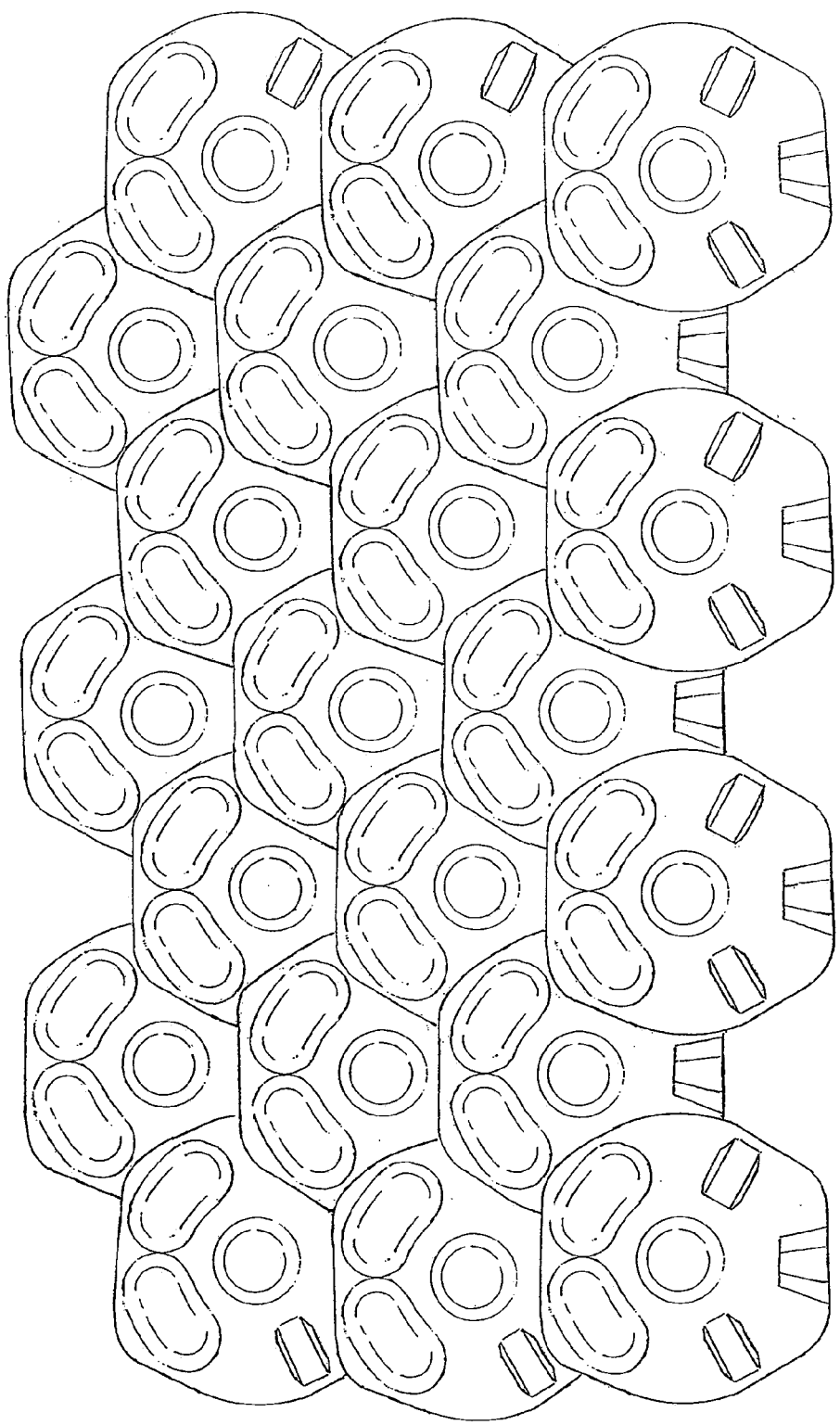
FIG. 11 illustrates a front elevation view of an extended imbrication pattern of ballistic tiles.
Figure 12:
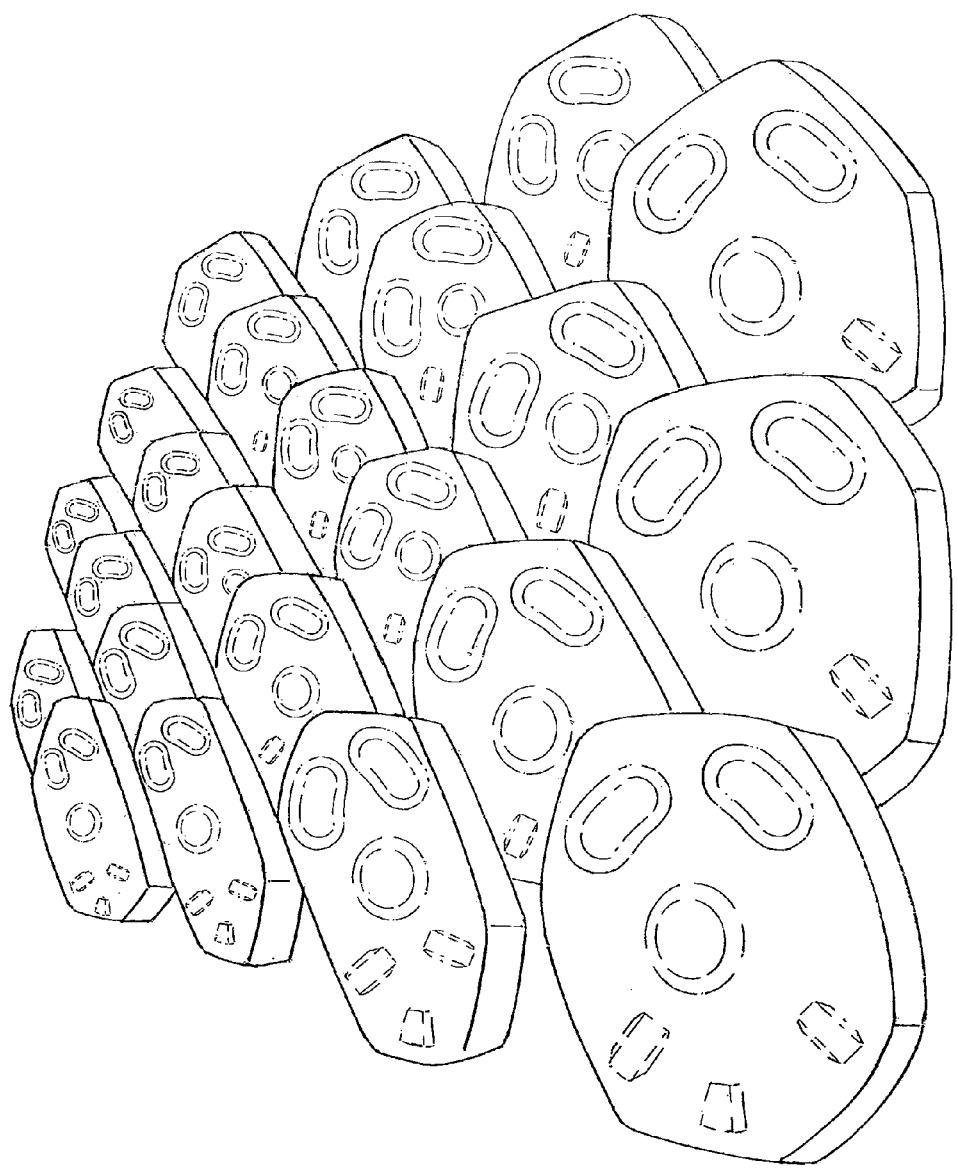
FIG. 12 illustrates a side perspective view of an extended imbrication pattern of ballistic tiles.

In this manner, all ballistic tiles 100a-d of the imbricated pattern 180 are supported against one another, and are able to transmit and distribute impact forces from an incoming ballistic projectile. Tiles 100a-d (and any additional imbricated tiles 100 added thereto) are also resistant to lateral motion by the interaction of protrusions 120a, c, and recesses 141a, c. Additional views of an extended imbrication pattern of ballistic tiles 100 are shown in front elevation view at FIG. 11, side perspective view at FIG. 12, and top plan view at FIG. 13. The ballistic tiles depicted in FIGS. 11-13 include further variations on the embodiment illustrated in FIGS. 1-10, among these the height of stand 146 has been extended, and the thickness of certain portions of the ballistic tile, particularly at the lateral shelf faces 108a, 108c, has been increased.

Certain alterations and variations of the present invention are nonetheless considered to be within its scope. For example, the function of protrusions 120a, 120c and recesses 141a, 141c does not necessarily require that they be at the particular disclosed locations. They may be elsewhere on the obverse side 102 and reverse side 104, provided that they interface with one another at corresponding locations of the imbricated pattern 108. In another alteration, the protrusions 120a, 120c may be provided on the reverse side 104, and the recesses 141a, 141c on the obverse side 102.

Figure 14:
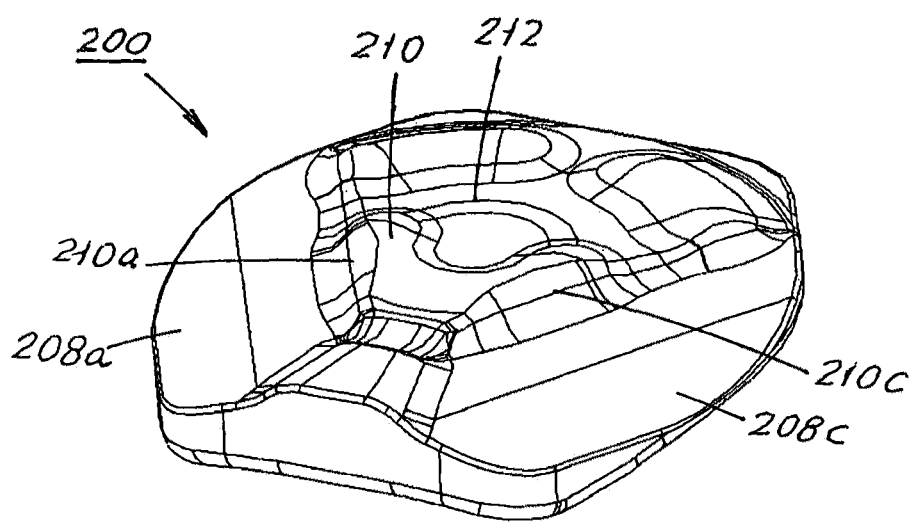
FIG. 14 illustrates a front perspective view of a ballistic tile according to a second embodiment of the present invention.
Figure 15:
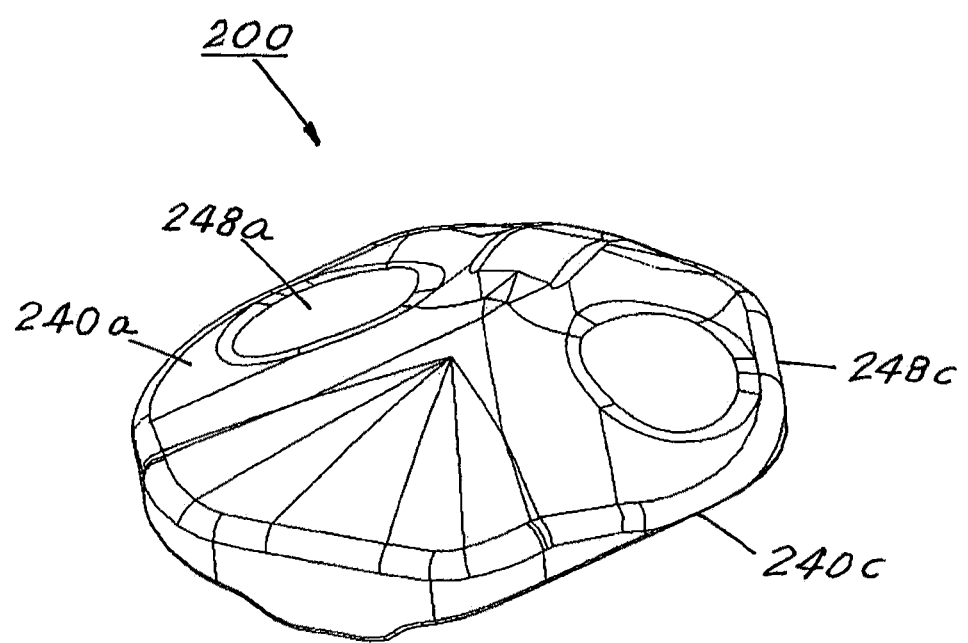
FIG. 15 illustrates a rear perspective view of a ballistic tile according to the second embodiment.

Turning then to FIG. 14, illustrated is a perspective view of a further ballistic tile, generally 200, according to a second embodiment of the present invention. A full description of the features of ballistic tile 200 that are common and shared with the corresponding prior embodiment will not be further discussed if being understood that the second embodiment includes all the features of the first embodiment except for features that are further discussed below. In this embodiment, ballistic tile 200 features lateral shelf face sections 208a, 208c without protrusions (e.g., 120a, 120c as on ballistic tile 100) thereon. Turning then to FIG. 15, on a reverse face 204 of ballistic tile 200, lateral footprint areas 240a, 240c are each provided with stands 248a, 248c, respectively, instead of recesses or channels. Otherwise, lateral foot print areas 240*a*, 240*c* are identical to foot print areas 140*a*, 140*c*.

Figure 16:
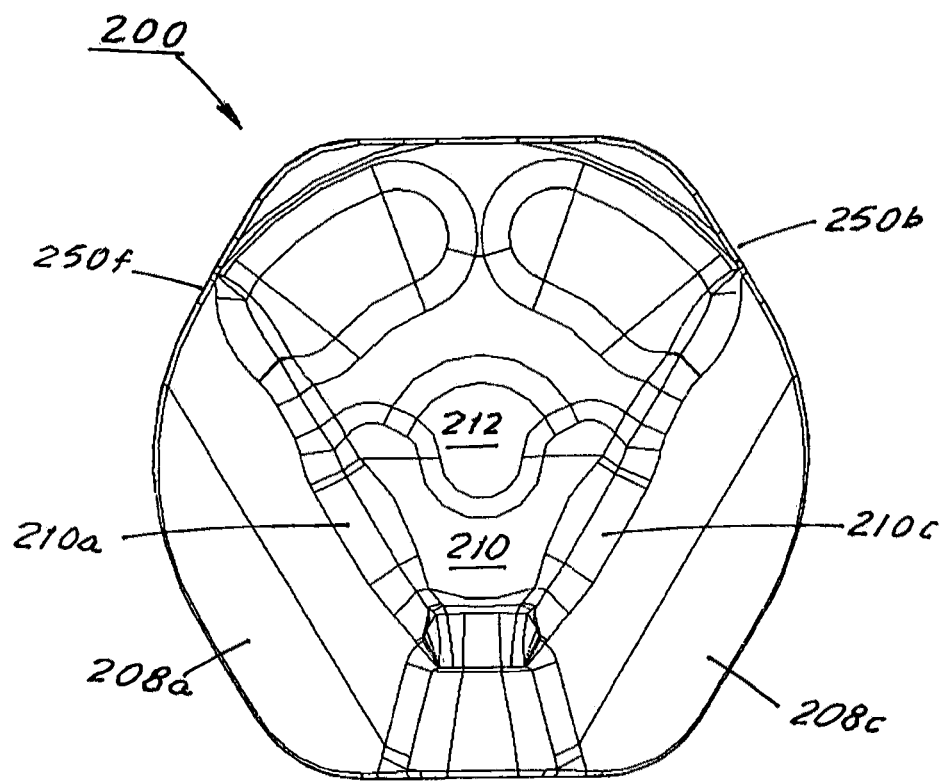
FIG. 16 illustrates a front elevation view of a ballistic tile according to the second embodiment.
Figure 17:
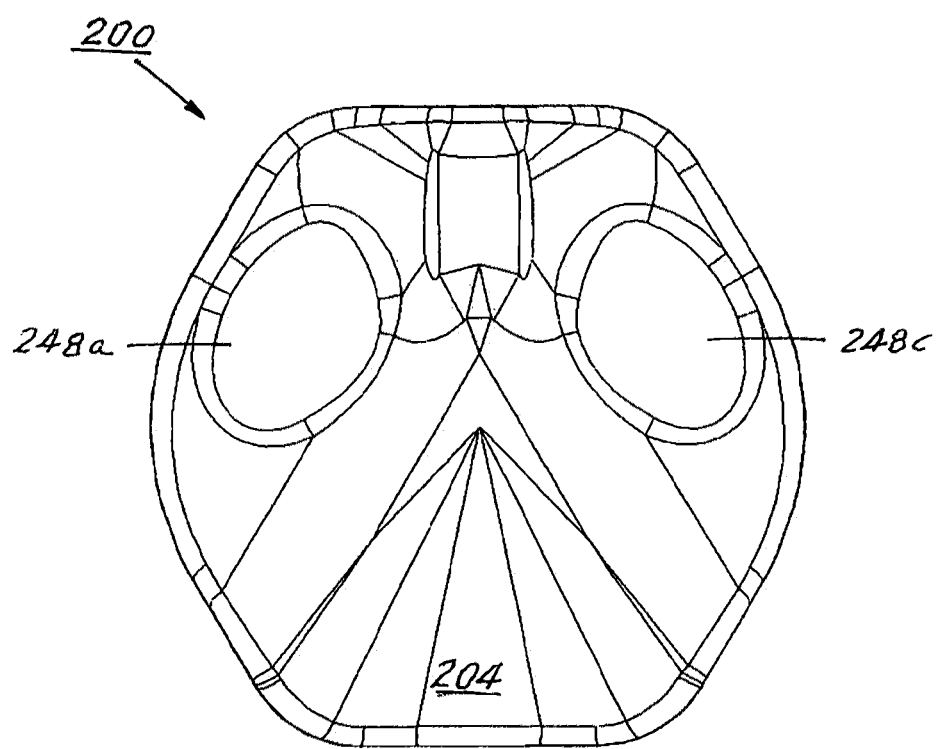
FIG. 17 illustrates a rear elevation view of the ballistic tile according to the second embodiment.
Figure 18:
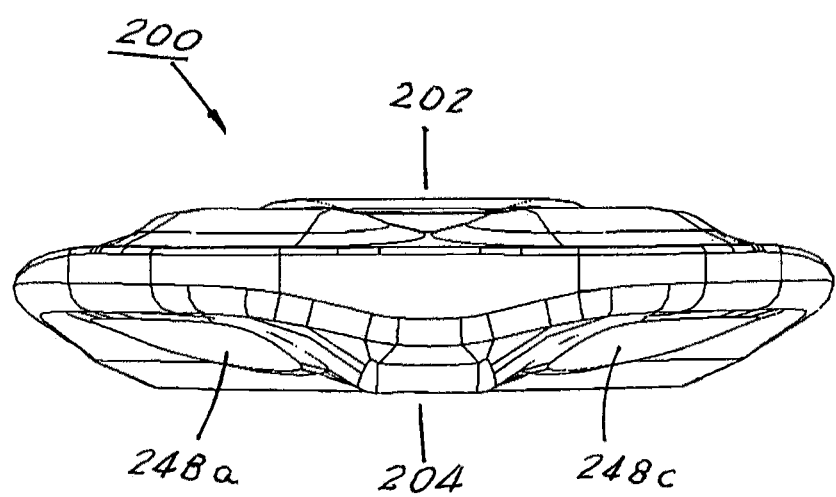
FIG. 18 illustrates a top plan view of the ballistic tile according to the second embodiment.
Figure 19:
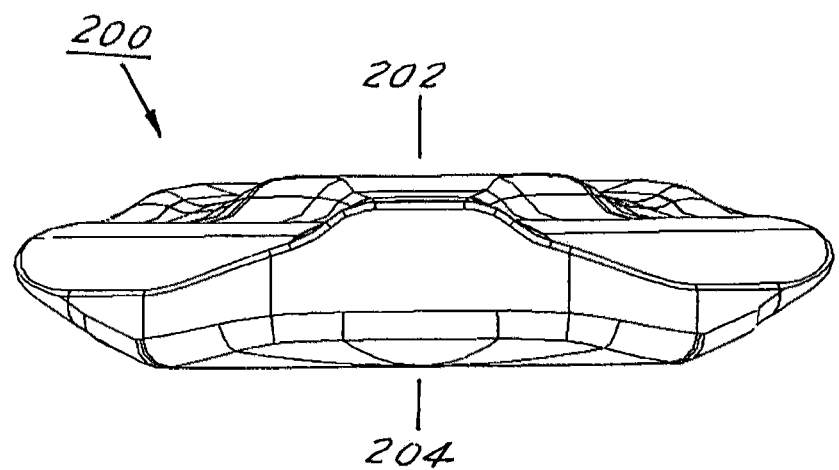
FIG. 19 illustrates a bottom plan view of the ballistic tile according to the second embodiment.

FIG. 16 illustrates a front elevation view of the ballistic tile 200. FIG. 17 illustrates a rear elevation view of the ballistic tile 200. FIG. 18 illustrates a top plan view of the ballistic tile 200, with the obverse side 202 facing upward as shown, and the reverse side 204 facing downward. FIG. 19 illustrates a bottom plan view of the ballistic tile 200, with the obverse side 202 again facing upward, and the reverse side 204 facing downward.

Figure 20:
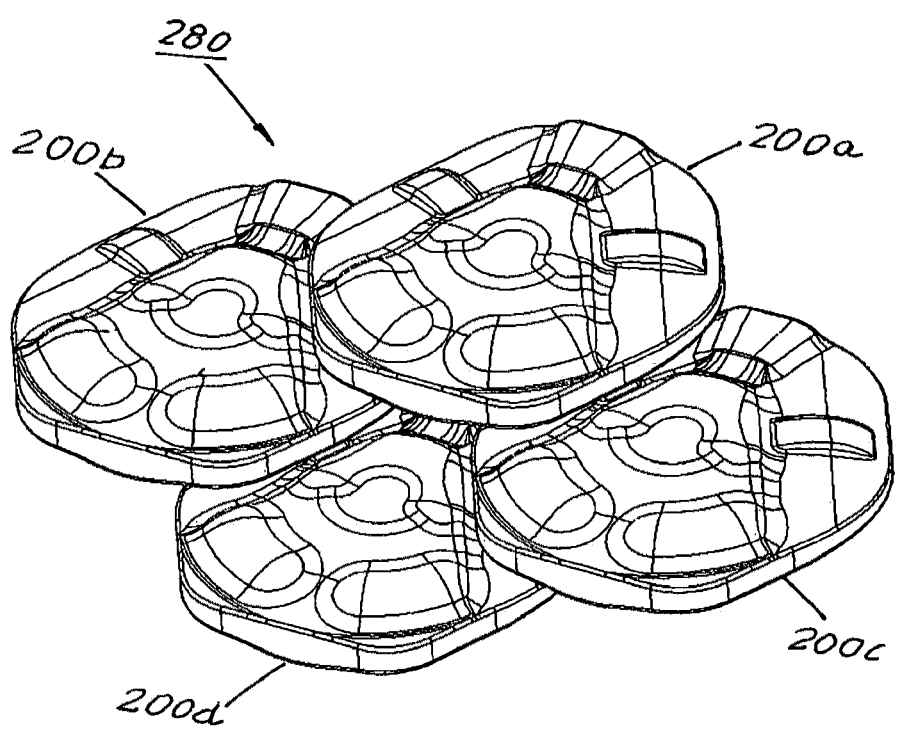
FIG. 20 illustrates a front perspective view of a four-tile imbricated pattern of ballistic tiles according to the second embodiment.
Figure 21:
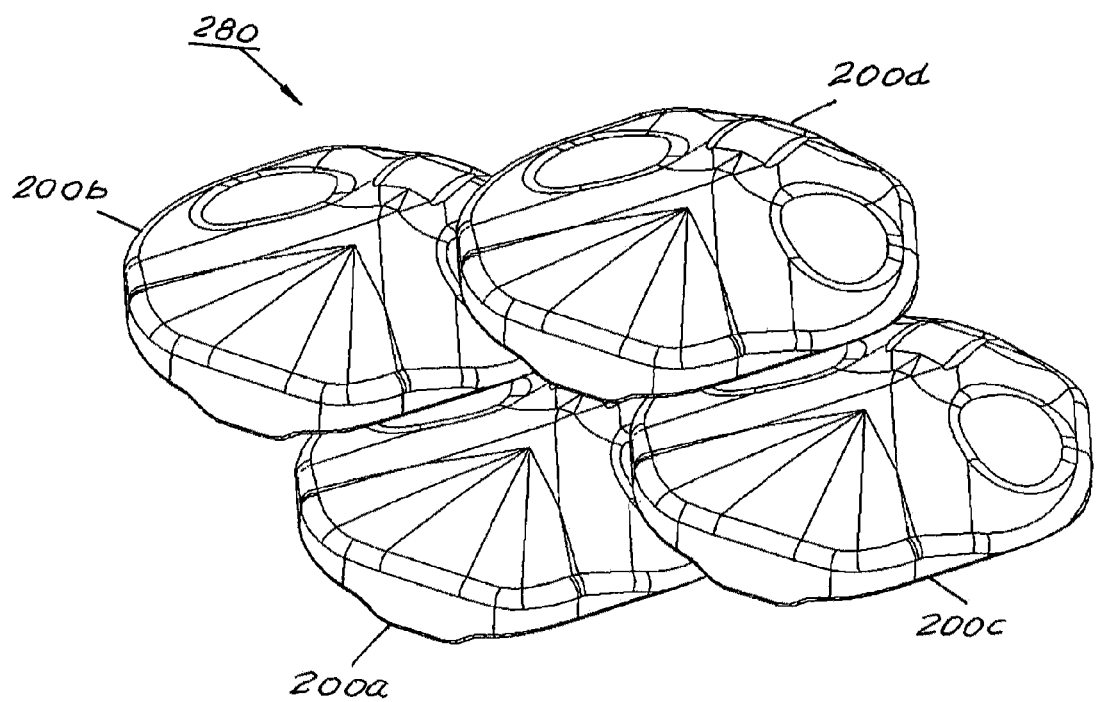
FIG. 21 illustrates a rear perspective view of the four-tile imbricated pattern of ballistic tiles according to the second embodiment.
Figure 22:
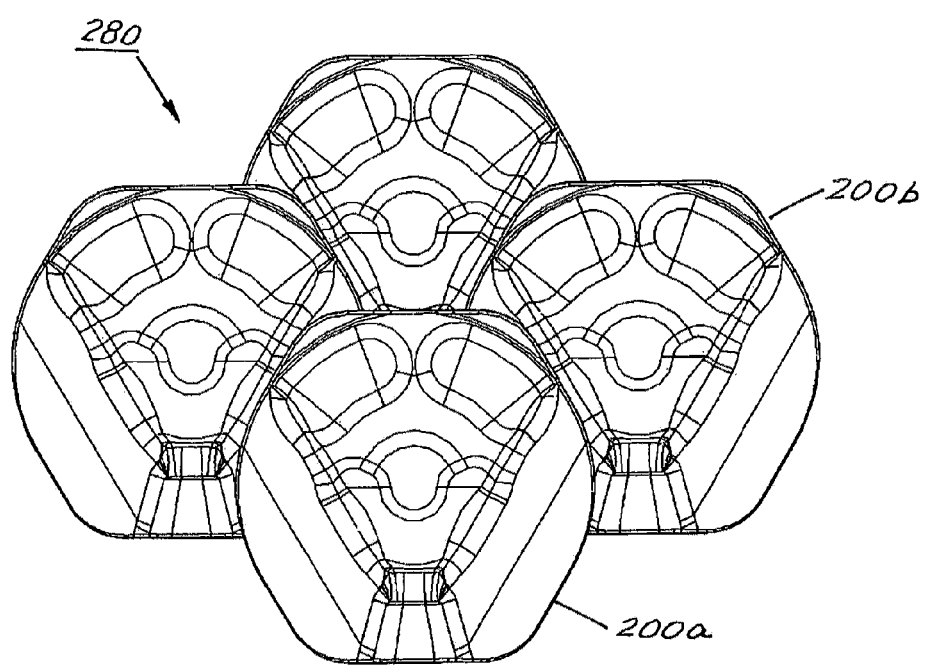
FIG. 22 illustrates a front elevation view of the four-tile imbricated pattern of ballistic tiles according to the second embodiment.
Figure 23:
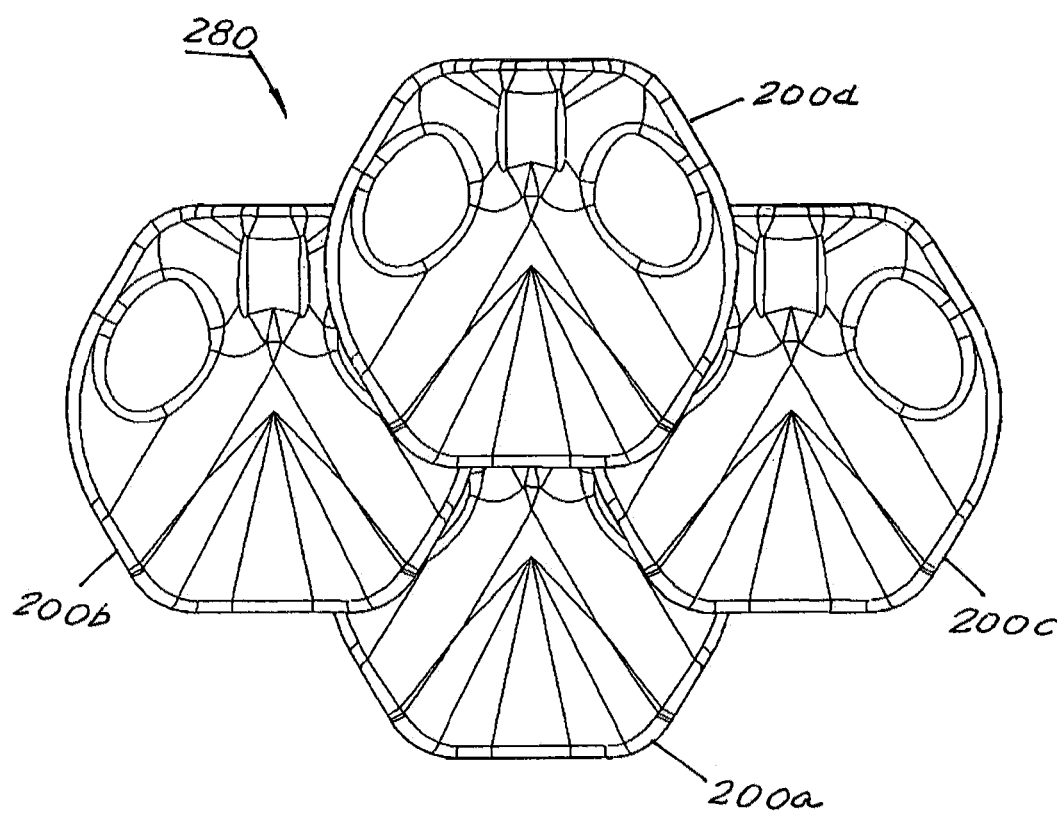
FIG. 23 illustrates a rear elevation view of the four-tile imbricated pattern of ballistic tiles according to the second embodiment.

Referring then to FIG. 20, illustrated is a perspective view of a four-tile imbricated pattern 280, representative of the imbrication of the ballistic tiles 200. In this case, the imbricated pattern 280 comprises four tiles 200*a-d*. The full description of the interaction between the tiles 200*a-d* will be dispensed with, in light of and with reference to the imbrication pattern 180 of the first embodiment tiles 100, above. FIG. 21 illustrates a rear perspective view of the imbrication pattern 280. FIG. 22 illustrates a front elevation view of the imbrication pattern 280. FIG. 23 illustrates a rear elevation view of the imbrication pattern 280.

Although the ballistic tile 200 lacks corresponding protrusions 120*a*, 120*c* and recesses 141*a*, 141*c* as on ballistic tile 100, lateral support is nonetheless provided among the tiles in their imbricated pattern 280. For example, and with reference to FIGS. 14, 16 and 22, the ridge 210 surrounding central depression 212 present lateral slopes 210*a*, 210*c*, facing respective lateral shelf areas 208*a*, 208*c*. In the imbricated pattern 280, edges 250*b* and 250*f* of the ballistic tile 200 bear against slopes 210*a*, 210*c*, respectively, of an adjacent ballistic tile 200 in the imbricated pattern.

Figure 24:
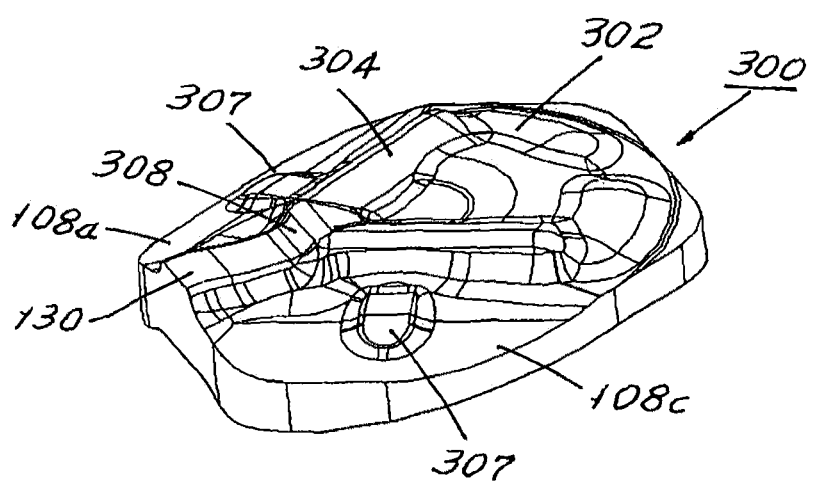
FIG. 24 illustrates a side perspective view of a tile according to the third embodiment of the present invention.
Figure 25:
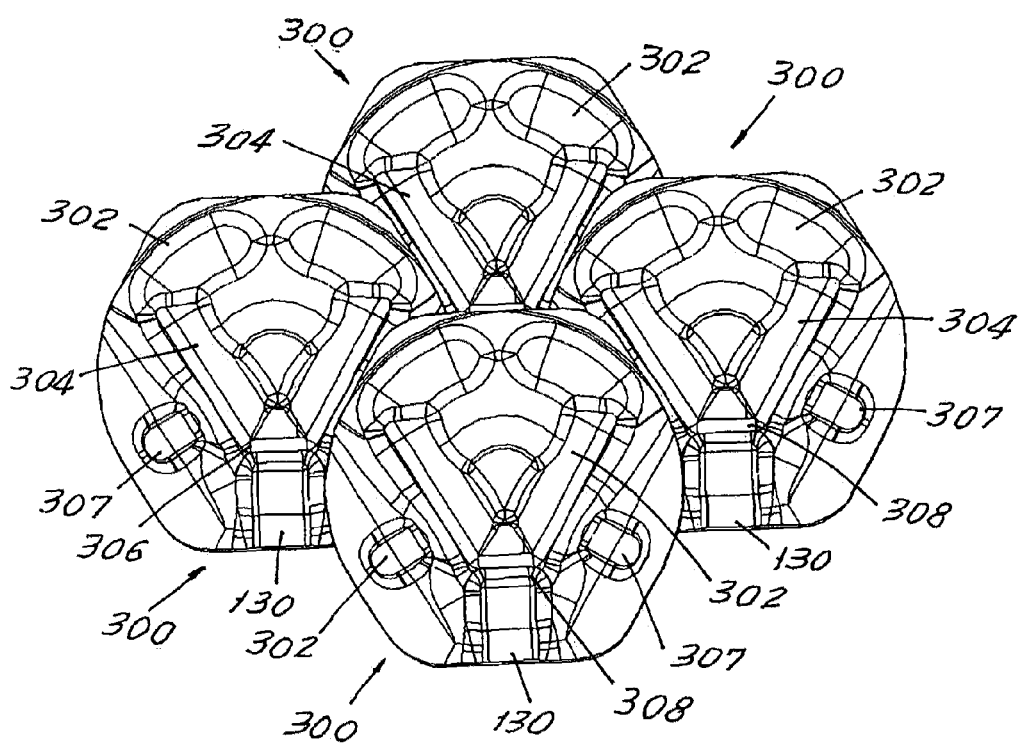
FIG. 25 illustrates a top plan view of a plurality of tiles according to the third embodiment arranged in an imbricated pattern.
Figure 26:
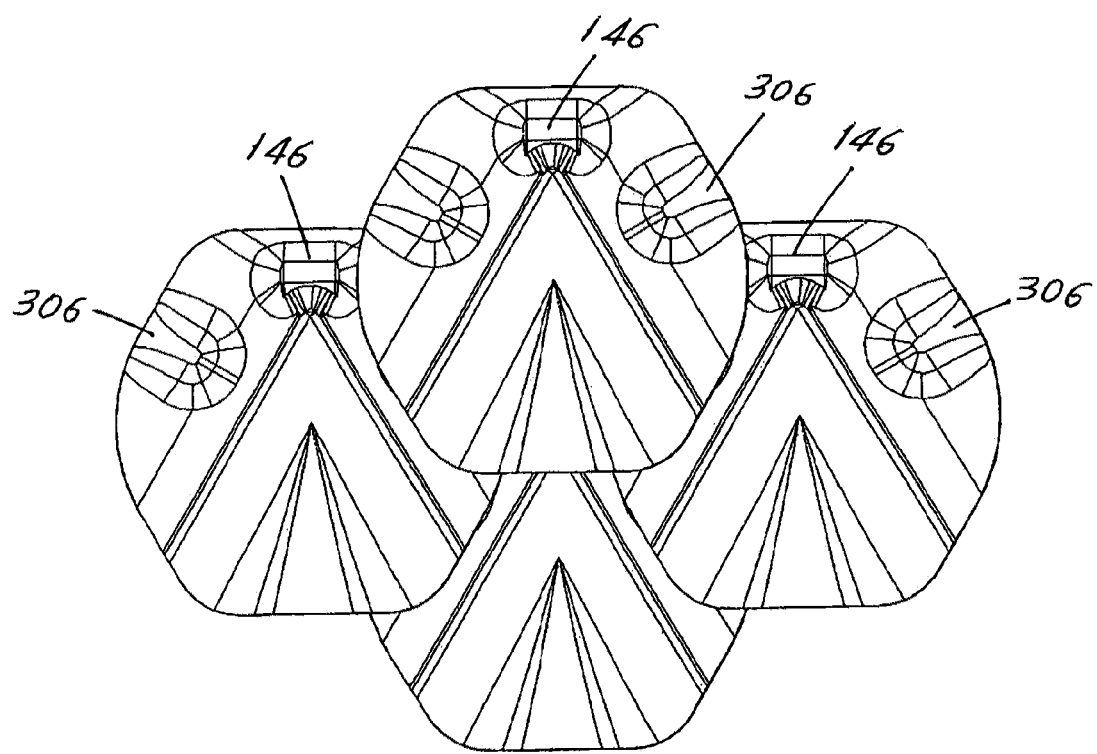
FIG. 26 illustrates a bottom plan view of a plurality of tiles according to the third embodiment arranged in an imbricated pattern.
Figure 27:
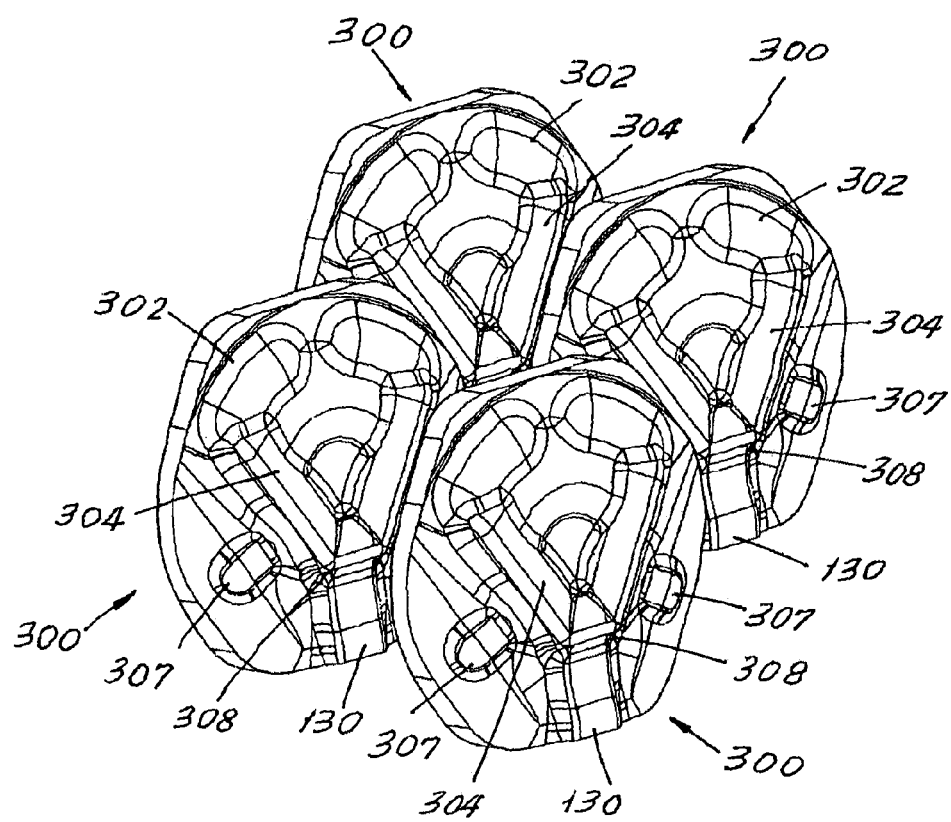
FIG. 27 illustrates a top perspective view of a plurality of tiles according to the third embodiment arranged in an imbricated pattern.
Figure 28:
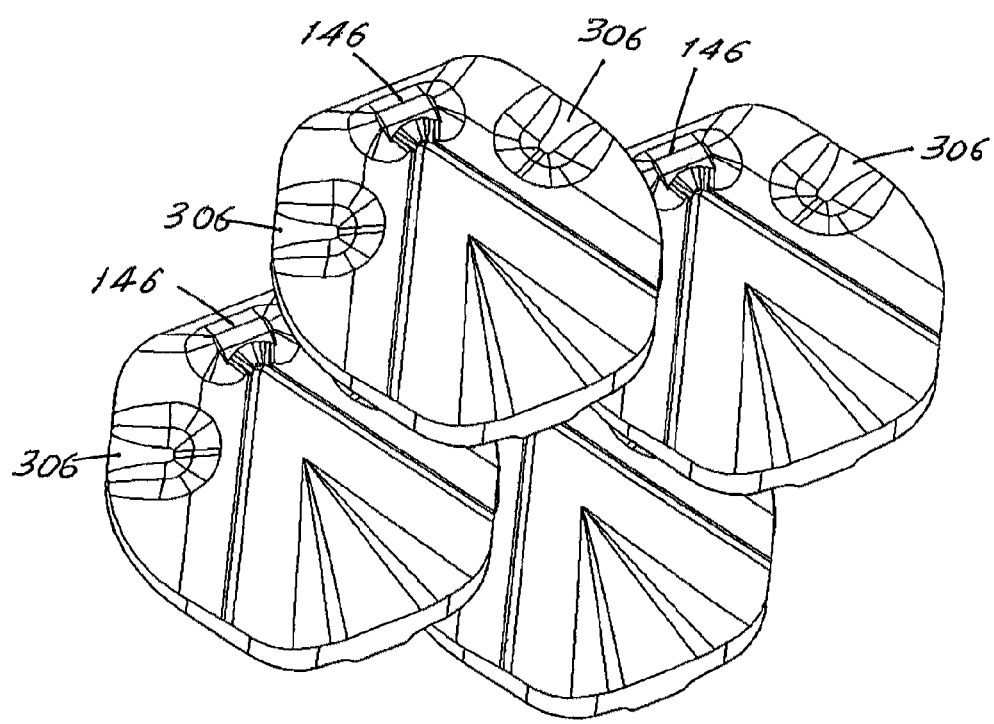
FIG. 28 illustrates a bottom perspective view of a plurality of tiles according to the third embodiment arranged in an imbricated pattern.

Referring now to FIGS. 24-26, in which like numerals identify like features, a tile 300 according to the third embodiment of the present invention includes a relief pattern on the strike face of the obverse side thereof that includes one raised portion 302. Raise portion 302 is realized by connecting arcuate ridges 114, 116 to a V-shaped ridge 304 that includes one surface sloping towards the center of tile 300 and another opposite surface sloping at a much steeper angle toward shelf sections 108*a*, 108*c*. Note that the V-shaped 304 may be raised above the height of ridges 114, 116 to provide further protection to the gaps between the adjacent tiles in the imbricated arrangement. Projectiles impacting at the highly oblique angles associated with entry through the seams are anticipated to impact the V-shaped ridges 304 and be adequately deflected resulting in a harmless flight path. Registry features, namely recesses 306 and protrusions 307 on shelf sections 108*a*, 108*c*, on the reverse face of each tile 300 include smoother surfaces to lessen bending-induced tension resulting from the ballistic impact. Regions inside the V-shaped ridges 306 are thickened relative to a ridge 110 shown in the other embodiments. Furthermore, protrusion 146 in each tile 300 is reduced in height so that it may mate with the interior surface of channel 308 in the back of protrusion 130 of another tile. Making protrusion 146 less protrusive, and eliminating the curvature on the radial edge surfaces, can allow tile 300 to be uniaxially pressed into its shape as a powder compact as opposed to the previous embodiments which could only be formed by slip casting. Compared to slip casting, pressing on a dual-action automated press facilitates rapid production at substantially reduced costs. Pressing will also permit a range of variation in part thickness so that different areal density systems can be fabricated and tested to address varying projectile threat levels. Unless otherwise mentioned, tile 300 includes the same features as the first embodiment, tile 100.

Figure 13:
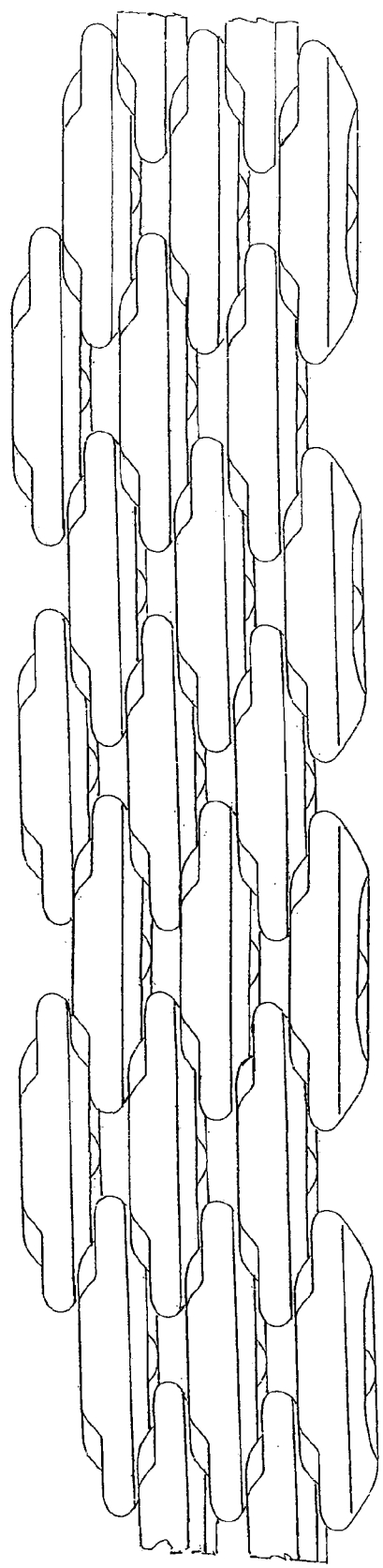
FIG. 13 illustrates a top plan view of an extended imbrication pattern of ballistic tiles.

Thus, in an armor arrangement including any one of the embodiments disclosed above, the surface undulations of the strike face encourages the turning of the projectile, which would increase its interaction area with the armor. Furthermore, features on the tiles facilitate cooperation and registry of the tiles. Moreover, as opposed to point contacts on opposing convex surfaces of the imbricated discus-shaped tiles of the prior art, an arrangement according to the present invention allows the tiles to rock. Thus, when flexed, gap formation between the tiles is substantially minimized. Note further that a substantial natural gap between upper and lower tiles in an imbricated pattern is largely covered by protrusion 146, which extends from the underside of each tile as best seen in FIG. 13.

It is contemplated that the present ballistic tiles 100, 200, 300 of the instant disclosure will be formed of a ceramic material, particularly one comprising sintered boron carbide or sintered silicon carbide. Ceramic materials of this type exhibit adequate resistance to fracture when subjected to ballistic projectile impact, yet are reduced in weight. A particularly desirable material is a sintered boron carbide body that is nearly phase-pure produced according to U.S. Pat. No. 7,592,279. Notwithstanding, other materials are suitable for the fabrication of ballistic tiles 100, 200, 300 including metals comprising steel or hardened steel, titanium, etc., or plastics such as HDPE, polycarbonate or the like.

Figure 29:
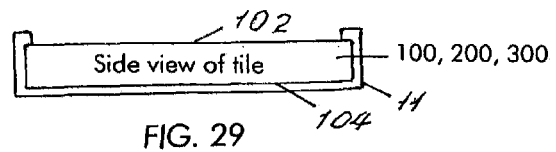
FIG. 29 shows a side plan illustration of an individual tile according to the present invention that includes a back covering according to another aspect of the present invention.

Referring to FIG. 29, in order to improve the performance of the tiles in an imbricated arrangement, the reverse side 104 and the edge of each tile 100, 200, 300 in an imbrication may be covered with and adhesively coupled to a ballistic fabric 11 such as a fabric made of E-glass fibers, Kevlar fibers, or carbon fibers. Covering the edge of each tile 100, 200, 300 is particularly useful in preventing spalling. In particular, it is contemplated that ballistic tiles 100, 200, 300 may be partially covered with a ballistic fabric, fiber, and/or material (e.g., aramid fiber, glass fiber, etc.), with such fabric 11 covering only a portion of the obverse face 102 as is necessary to secure the covering thereto, if any portion of the opposite face 102 is to be covered at all. One contemplated embodiment is to cover the reverse side 104 entirely and the edge of each tile entirely with a ballistic fabric 11, while the margin of the obverse side 102 adjacent the edge is covered by the ballistic fabric 11 no more than approximately the thickness of the tile at its center as illustrated by FIG. 29.

Figure 31:
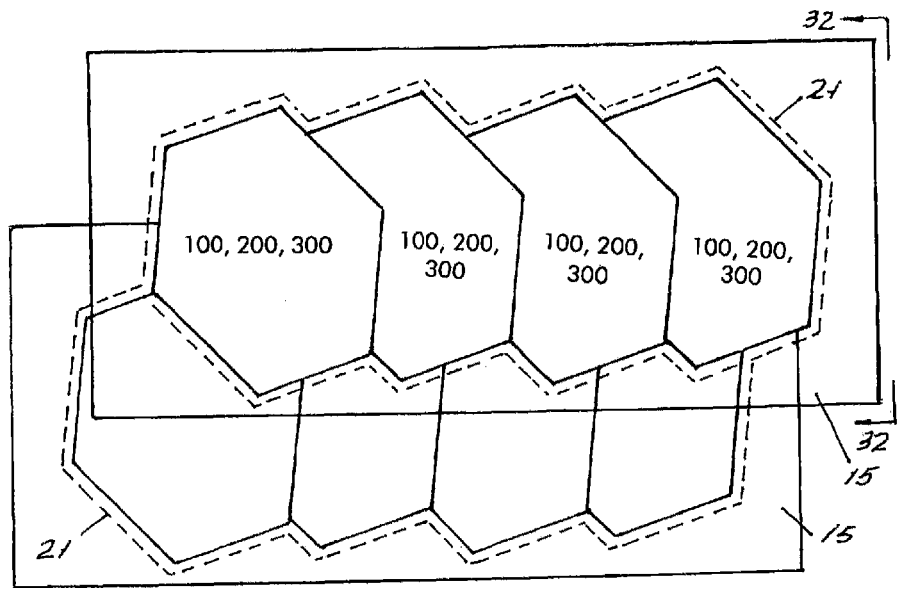
FIG. 31 illustrates rows of tiles in pockets formed of ballistic fabric and then arranged in an imbricated pattern.
Figure 32:
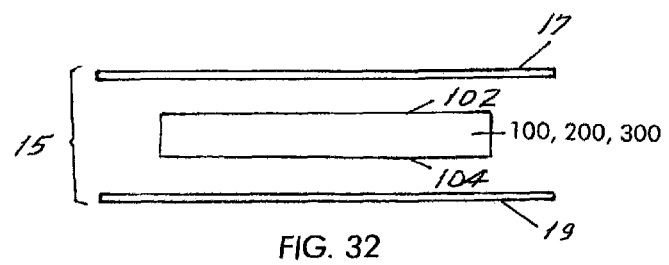
FIG. 32 is a side plan view of a pocket and tile assembly as illustrated by FIGS. 30 and 31 in the direction of arrows 32 in a disassembled state.
Figure 30:
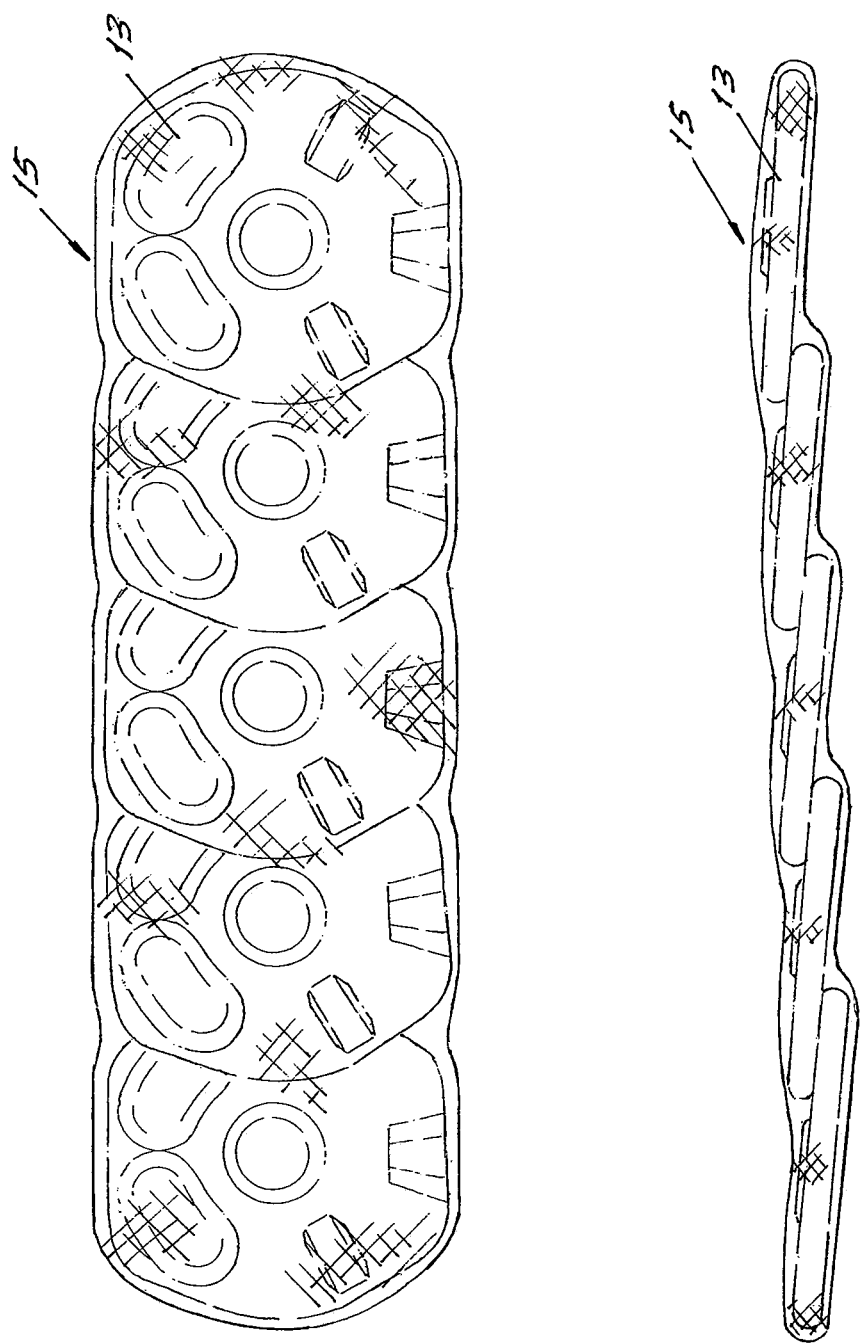
FIG. 30 shows a top plan view of a row of tiles according to the present invention imbricated and then received inside a pocket that is made with two pieces of ballistic fabric, and a side plan view of the pocket and tile arrangement flexed, illustrating the ability of the pocket to contribute to the retention of the imbricated arrangement.

Durability of the imbricated arrangement can be facilitated by disposing the tiles 100, 200, 300, with or without coverage by a ballistic fabric (preferably with a ballistic fabric) in an elongated pocket 15 that is made of a ballistic fabric 13 such as a fabric made of a Kevlar weave as illustrated by FIG. 30. The pockets 15 can be then sewn to a backing fabric as additional mechanical support to, for example, an adhesive. The ballistic fabric 13 itself aids in the protective properties of an armor panel so made, in addition to ensuring the protection afforded by the proper imbrication of ballistic tiles 100, 200, 300 according to the present invention, for example by resisting lateral deviation. More specifically, referring to FIGS. 31 and 32, individual tiles 100, 200, or 300 that may be backed by a ballistic fabric 11 as illustrated by FIG. 29 can be placed in an imbricated pattern along a row, and entombed in an epoxy impregnated pocket comprised of a front Kevlar fabric 17 and a back Kevlar fabric 19 as shown by FIGS. 31 and 32. The adhesive along with stitching 21 (optional) will hold the tiles in their mutual imbricated positions, restricting them from rotation, but allowing the tiles to rock about their contact lines. These rows can be then sewn around their periphery (in a U-shaped pattern) onto an adhesive-coated Kevlar sheet. Another pocket containing another row of tiles will then be placed on top of the first, allowing the tiles to be located in their proper imbricated pattern as illustrate by FIG. 31, and will be similarly sewn in. This pattern can be repeated to make the entire pack. Each pack can be comprised of 18 tiles.

In one example, nearly phase-pure sintered boron carbide tiles according to the present invention were individually backed by layers of prepregnated ballistic fabric comprising E-glass fibers impregnated with epoxy (J. D. Lincoln, Cost Mesa Calif., 0.1 lbs/sqft). The fabric was then autoclaved onto each tile so that the back face and radial edge of each tile were covered. The backing served as a containment which would resist radial spall of fractured ceramic upon impact by a projectile. The backed tiles were then placed in an imbricated pattern and held in place by being sandwiched between a front 17 and a back 19 epoxy-coated Kevlar sheets (see FIG. 32 for illustration). Behind (away from the strike face) was an independent textile package (14 layers of 1420 denier 22×22 aramid fabric and 10 layers of 600 denier XLT 29×29) at 0.995 lbs/sqft. These were in turn backed by a NIJ Level 3A (Quantum KXP 3-A Spectra/Kevlar, Evolution Armor, Missouri City, Tex.) textile package at 1.03 lbs/sqft. Without the 3A vest, the system had an areal density of ~7.7 lbs/sqft, which is close to the XSAPI specification for a monolithic plate.

The foregoing is disclosed in U.S. Pat. No. 8,434,396, assigned to Verco Materials, LLC, which discloses an armor system based on an imbricated array of ceramic tiles wrapped in epoxy impregnated glass or carbon fiber fabric. This system allows for assembling an imbricated armor around features such as the human torso by slight rocking angle changes permitted at the contact points between the tiles (wrapped in epoxy-impregnated stiff fibers such as carbon fiber).

Figure 33B:
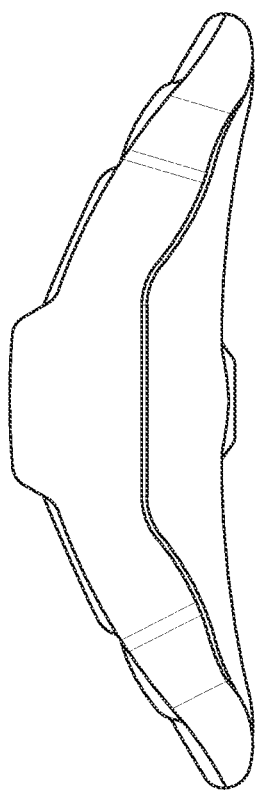
FIGS. 33A and 33B show a curved tile according to the invention.
Figure 33A:
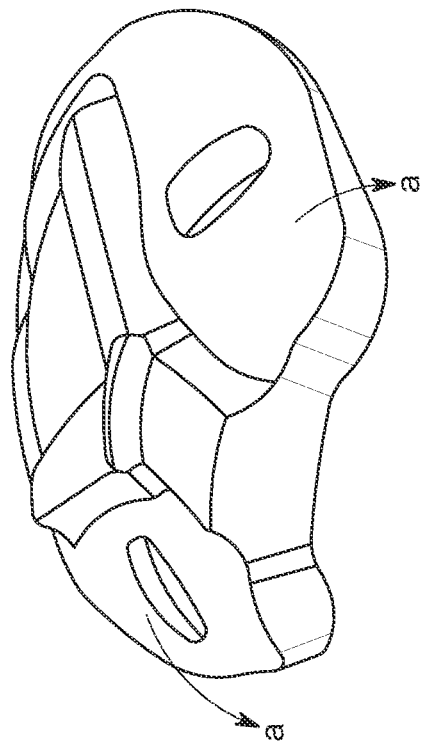

Referring to FIGS. 33A and 33B, for protection of body parts with relatively smaller radii of curvature, the tile 100, 200 or 300 may be provided with a downward-sloping distortion to the shelf sections 108a, 108b of the tile (labeled "a"), which facilitates a smooth curvature in the imbricated assembly around a body part having a radius of curvature that is smaller than the human torso. Thus, the imbricated assembly using a tile 400, or a plurality of tiles 400, will have a radius of curvature in the range of two inches to 6 inches.

Figure 34B:
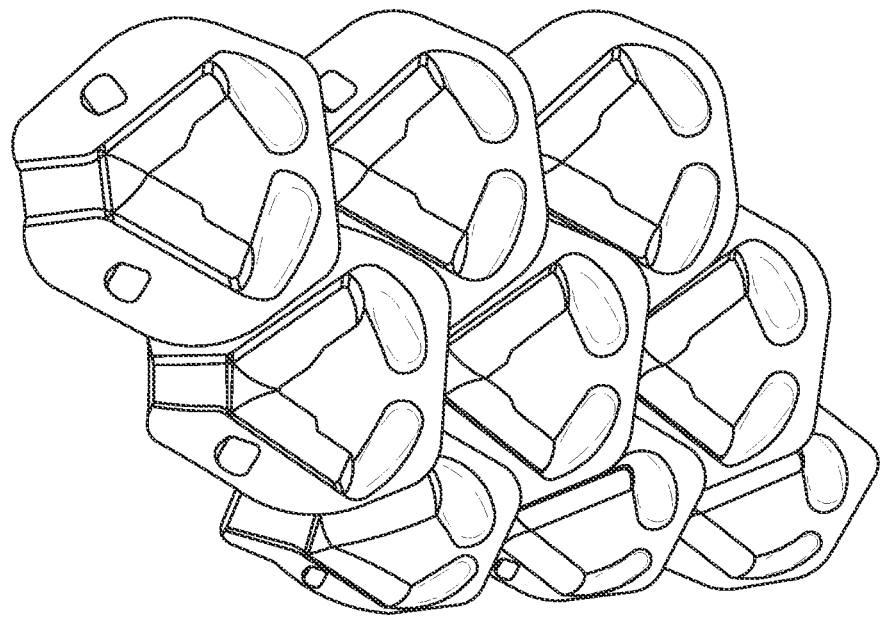
FIGS. 34A and 34B show an assembly of curved tiles (see FIGS. 33A and 33B) to form an imbricated pattern, which would contour to the shape of the inner thigh for femoral artery protection against rifle threats.
Figure 34A:
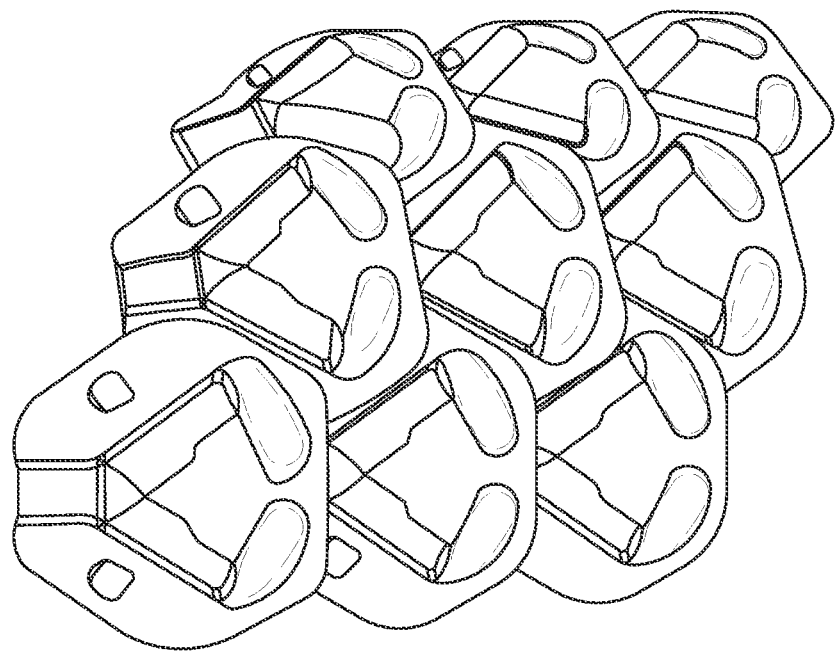
Figure 35:
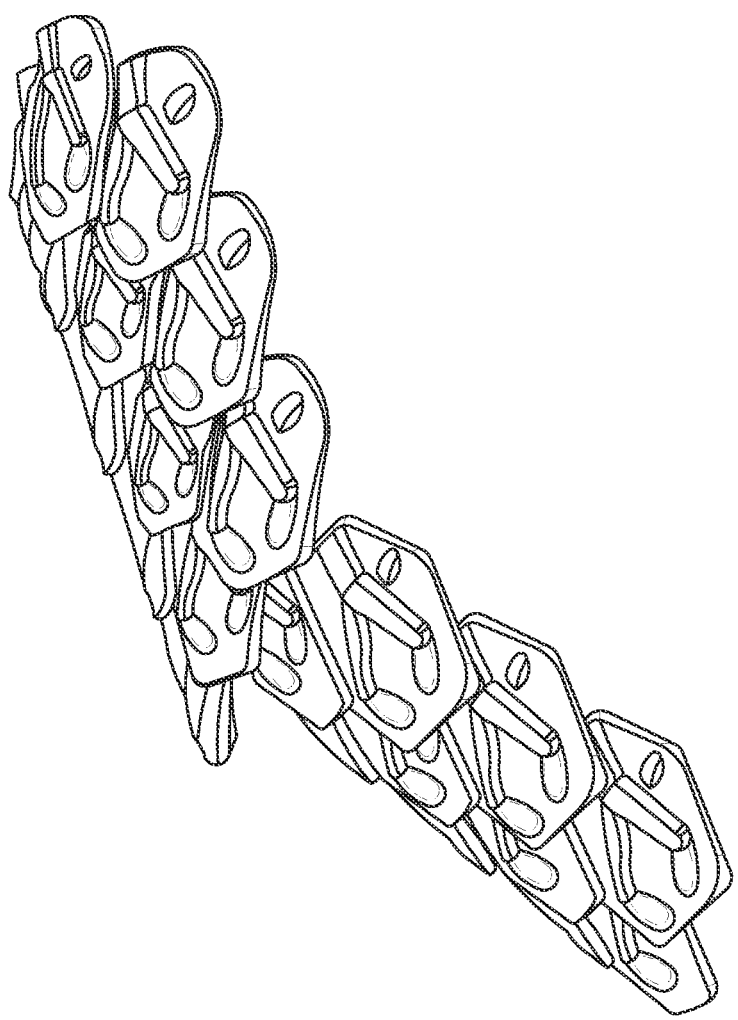
FIG. 35 shows an imbricated assembly for shoulder and deltoid protection using curved tiles (see FIGS. 33A and 33B).

An imbricated tile arrangement using a tile 400 as shown in FIGS. 33A and 33B can intimately follow the contour of a highly vulnerable part of the human body. For smaller body frames, incorporating a line of curved tiles 400 (FIGS. 33A and 33B) in with the standard tiles 100, 200, 300 (i.e. tiles disclosed in U.S. Pat. No. 8,434,396) will better turn the corner between the torso front and the torso side without opening gaps between the tiles in the imbricated assembly. A body extremity which could be protected by such an imbricated armor system is the upper inner thighs within which the femoral artery resides (e.g. FIGS. 34A and 34B). The shoulder and deltoid regions (e.g. FIG. 35) can also be better protected with an imbricated armor arrangement using a tile according to FIGS. 33A and 33B.

Figure 36A:
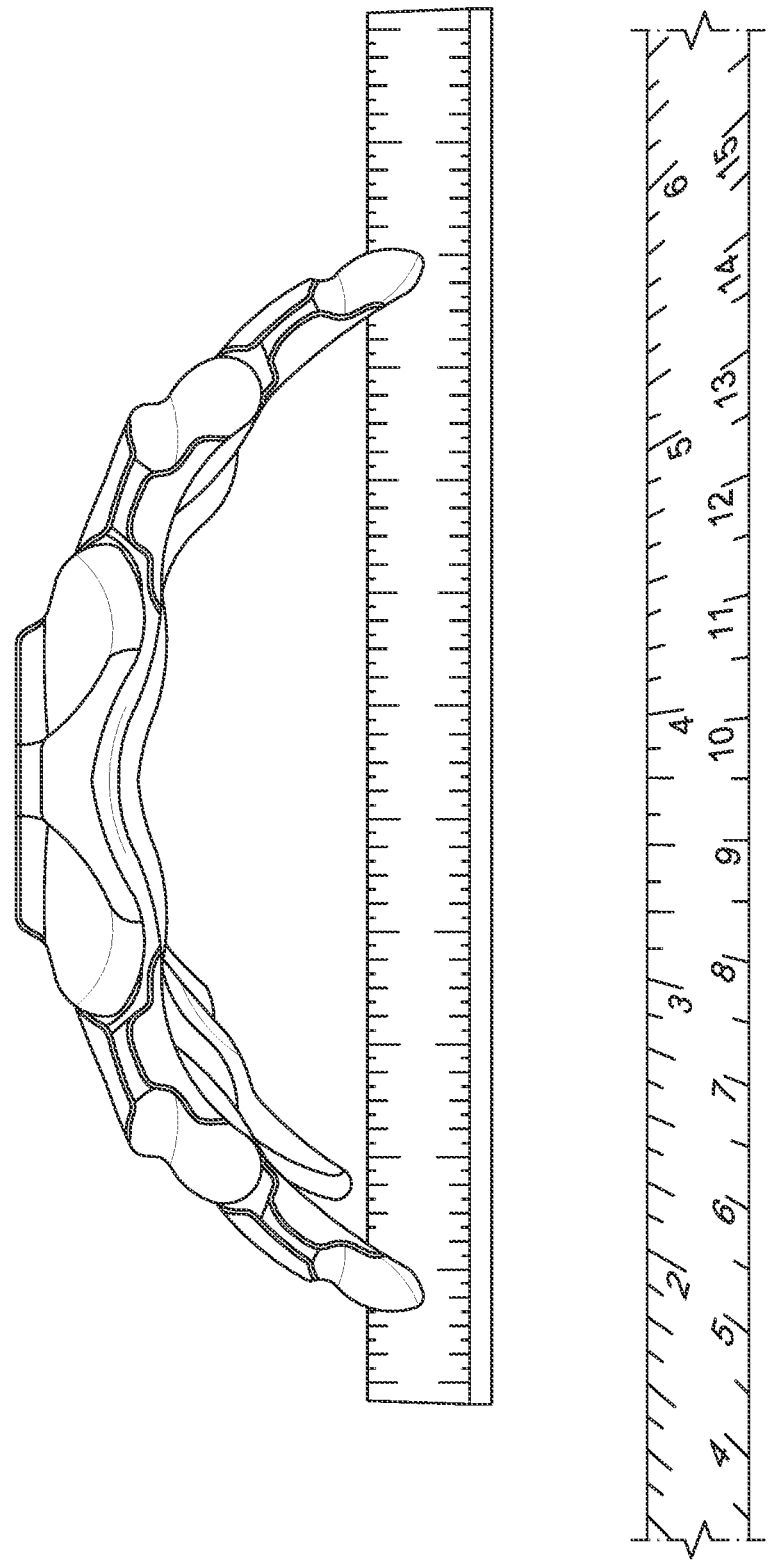
FIGS. 36A-36C show pictures of imbricated prototypes made using curved tiles according to the present invention.
Figure 36B:
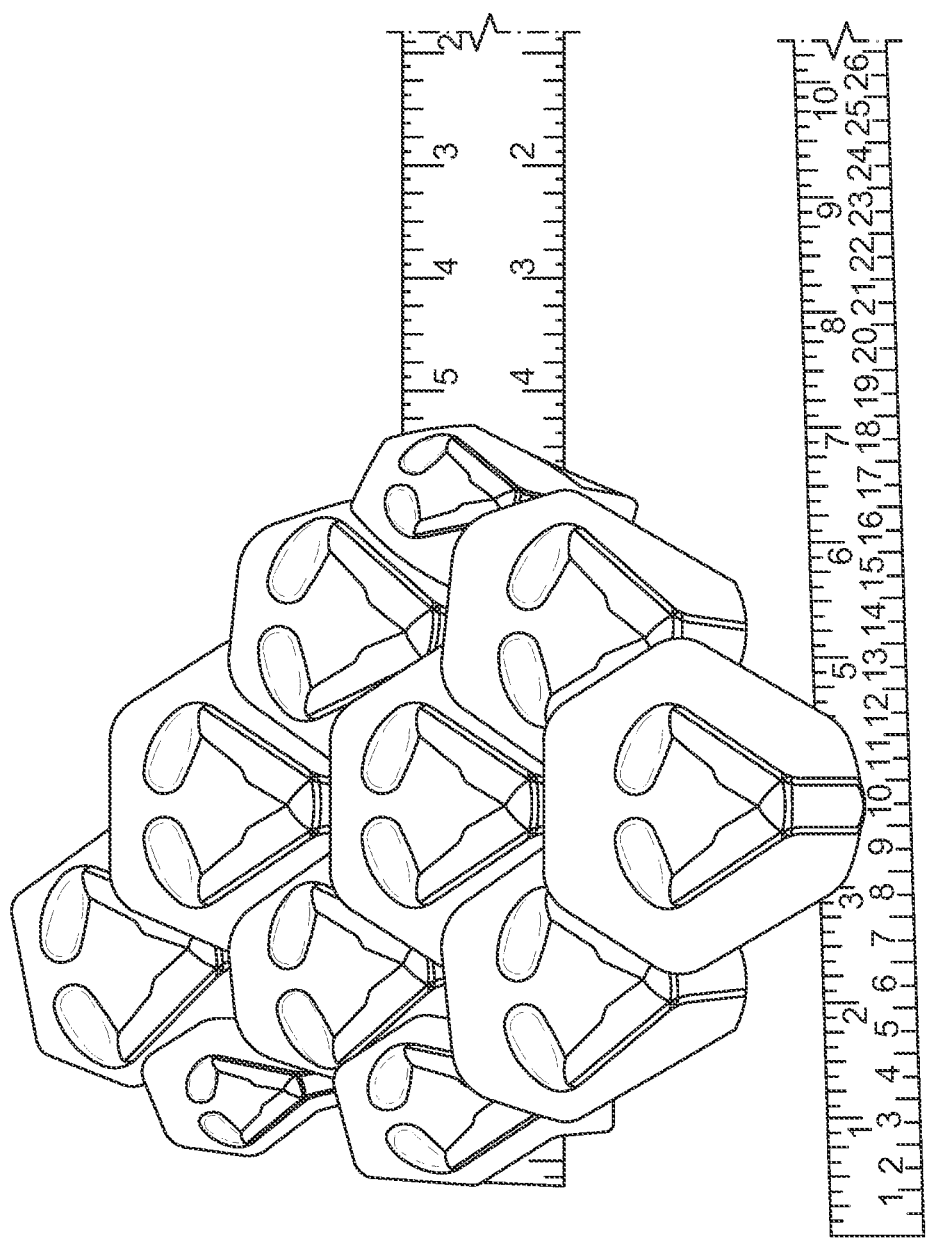
Figure 36C:
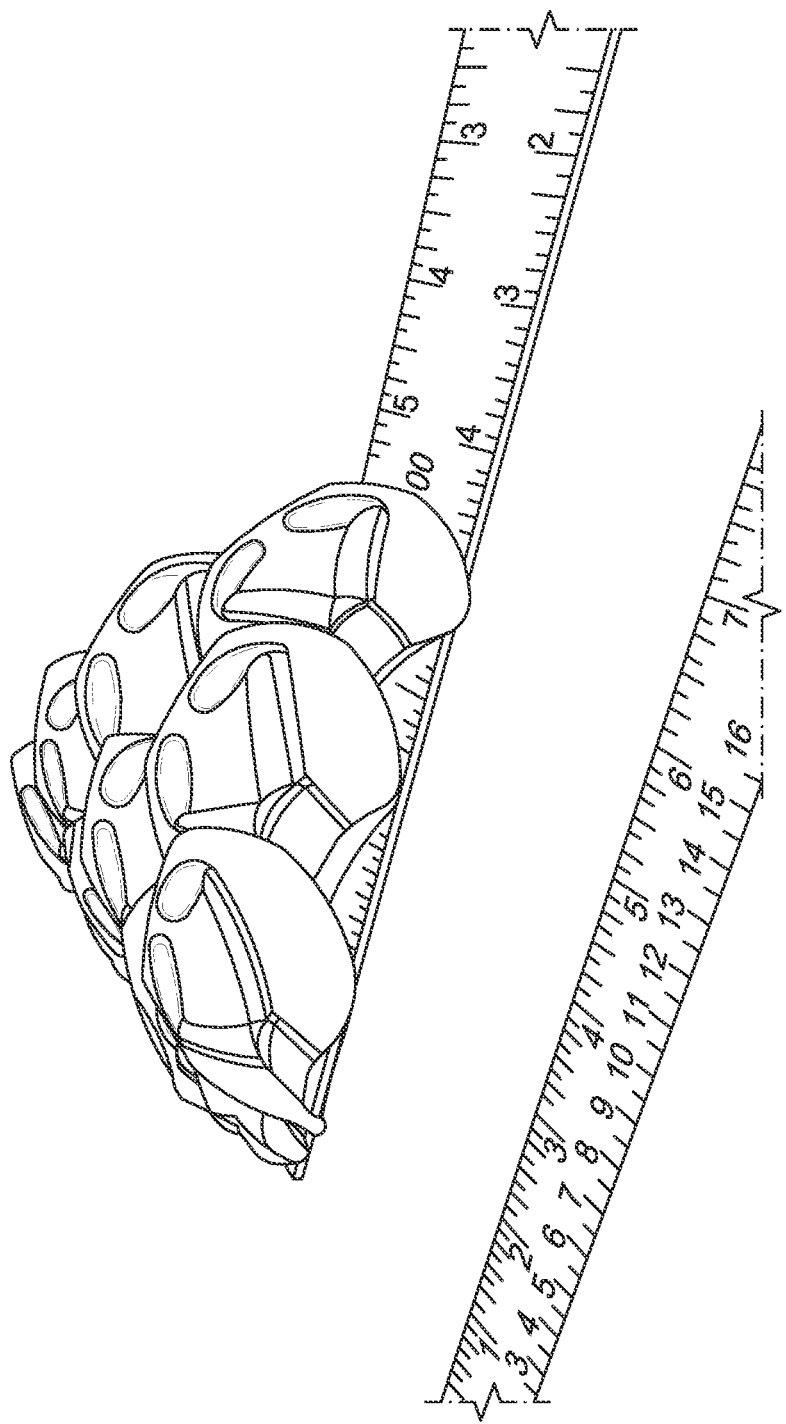

FIGS. 36A-36C show various views of prototypes that use a tile 400 or tiles 400 in an imbricated arrangement. As can be readily understood, when a tile 400 or tiles 400 are used, there may be a little rocking between the tiles at the contact points, without opening up gaps. In the arrangements shown in FIGS. 36A-36C the radius of curvature is in the range of 2.4-2.9 inches. However, the tile(s) 400 can be made with a larger radius of curvature to accommodate the human body (i.e., in the range of two to six inches). An arrangement of curved tiles 400, each with a slight curvature, or a mixture of flat 100, 200, or 300 and curved tiles 400 would accomplish the objective of obtaining an imbricated arrangement that can follow a curved body surface with a radius of curvature in the range of two to six inches without gaps between the overlapping tiles.

The mixing flat 100, 200, or 300 and curved tiles 400 is also important for torso protection in which the armor wraps around to the side of the torso. The transition from the front to back will be better served with rows of curved tiles 400 to minimize the gap formation along that zone of transition.

The tile 400 shown in FIGS. 33A and 33B may have corners that are rounded.

The shelf portions 108a and 108b of the tile 400 may each include a feature that registers with a corresponding feature on the back face of a respective overlapping tile 100, 200, 300 or 400.

The strike face of the tile 400 may include a relief pattern comprising a plurality of raised portions, like a standard tile 100, 200, or 300. Each raised portion may be arcuate and may include a convex outer surface.

The strike face of the tile 400 may include a relief pattern comprising a single, continuous raised surface.

The tile 400 may include a covering coupled to the reverse face thereof that extends at least along the peripheral edges thereof.

The armor arrangement that includes a tile 400 may include a plurality of elongated and flexible pockets each receiving a plurality of tiles (100, 200, or 300, with the tile 400), wherein the pockets are coupled to a backing.

The armor arrangement may further include a plurality of elongated and flexible pockets each receiving a plurality of clad tiles (100, 200, or 300, with the tile 400), the pockets being coupled to a backing.

The tiles (100, 200, or 300, with the tile 400) of the armor may be made of sintered boron carbide, or sintered silicon carbide.

The tiles (100, 200, or 300, with the tile 400) may be cooperatively arranged in an imbricated pattern.

The tile 400 may include a strike face having a V-shaped relief pattern that overlaps a portion of at least three other tiles (100, 200, 300 or 400) such that its edge is positioned behind a respective portion of a V-shaped relief pattern of each of the other three tiles, each V-shaped relief pattern being raised high enough to intercept a projectile travelling at an oblique angle to protect a seam defined by the overlapping of the tiles.

The total thickness of the overlapped regions of two overlapping tiles (100, 200, or 300 with the tile 400) may be thicker than the thickest section of each individual tile but less than 100% thicker than the thickest section of each individual tile.

The total thickness of the overlapped regions of two overlapping tiles (100, 200, or 300 with the tile 400) are 18% to 75% thicker than the thickest section of each individual tile.

The foregoing ballistic tiles and combinations and applications thereof have been described with reference to certain illustrative embodiments. These embodiments are merely illustrative, and not limiting, on the scope of the present disclosure. Certain modification and alterations will be apparent to those of ordinary skill in the art in light of the instant disclosure, without departing from its scope.

What is claimed is:

1. An armor arrangement comprising a plurality of individual tiles cooperatively arranged to realize a flexible body, each tile comprising an obverse face, a reverse face opposite said obverse face, and an endless edge between said obverse face and said reverse face, said tile including a geometric profile defined by a plane disposed between said obverse face and said reverse face and intersecting said edge, said geometric profile including a first peripheral boundary, a second peripheral boundary opposite said first peripheral boundary, a third peripheral boundary extending between said first and said second peripheral boundaries and connected to said first and to said second peripheral boundaries by respective corners, and a fourth peripheral boundary opposite said third peripheral boundary, extending between said first and said second peripheral boundaries and connected to said first and to said second peripheral boundaries by respective corners, said first and said second peripheral boundaries having one radius of curvature, and said third and said fourth boundaries having another radius of curvature larger than said one radius of curvature,
   wherein said obverse face includes a first region and a second region each configured to be overlapped by a corresponding region of a reverse face of another tile, and a strike face that is not overlapped by another tile, said first region and said second region being adjacent said strike face that is not overlapped by another tile,
   wherein said first region and said second region each slopes downwardly from said strike face toward respective first and second peripheral boundaries and are overlapped by corresponding regions on the back face of respective tiles to permit a curved imbricated pattern that follows the contour of a human body having a radius of curvature in the range of two to six inches;
   wherein said armor arrangement is configured to be worn over the upper inner thigh region, or the shoulder and deltoid region of the human body,
   wherein the strike face of each tile in the curved imbricated pattern includes a V-shaped relief pattern,
   wherein each tile in the curved imbricated pattern overlaps a portion of three other tiles in the curved imbricated pattern,
   wherein each tile in the curved imbricated pattern has a respective portion of the endless edge thereof bearing against a respective portion of a V-shaped relief pattern of one of the other three tiles in the curved imbricated pattern, and
   wherein each V-shaped relief pattern of each tile in the curved imbricated pattern is raised high enough to intercept a projectile travelling at an oblique angle toward the armor.

2. The armor arrangement of claim 1, wherein said corners are rounded.

3. The armor arrangement of claim 1, wherein said first and second regions each includes a feature that registers with a corresponding feature on the back face of a respective overlapping tile.

4. The armor arrangement of claim 1, wherein said strike face includes a relief pattern comprising a plurality of raised portions.

5. The armor arrangement of claim 4, wherein each raised portion is arcuate and includes a convex outer surface.

6. The armor arrangement of claim 1, wherein said strike face includes a relief pattern comprising a single, continuous raised surface.

7. The armor arrangement of claim 1, wherein each tile includes a covering coupled to said reverse face thereof and extending at least along the peripheral edges thereof.

8. The armor arrangement of claim 1, further comprising a plurality of elongated and flexible pockets each receiving a plurality of tiles, wherein said pockets are coupled to a backing.

9. The armor arrangement of claim 7, further comprising a plurality of elongated and flexible pockets each receiving a plurality of clad tiles, wherein said pockets are coupled to a backing.

10. The armor arrangement of claim 1, wherein said tiles are comprised of sintered boron carbide.

11. The armor arrangement of claim 1, wherein said tiles are comprised of sintered silicon carbide.

12. The armor arrangement of claim 1, wherein the total thickness of overlapped regions of two overlapping tiles is higher than the thickest section of each individual tile but less than 100% thicker than the thickest section of each individual tile.

13. The armor arrangement of claim 1, wherein the total thickness of overlapped regions of two overlapping tiles is 18% to 75% higher than the thickest section of each individual tile.

* * * * *